US011067963B2

(12) United States Patent
Eiland et al.

(10) Patent No.: US 11,067,963 B2
(45) Date of Patent: Jul. 20, 2021

(54) SYSTEM AND METHOD FOR THERMAL MANAGEMENT IN A MULTICOMPONENT SYSTEM

(71) Applicant: Dell Products L.P., Hopkinton, MA (US)

(72) Inventors: Richard Mark Eiland, Austin, TX (US); Jianlin Zheng, Pflugerville, TX (US); Hasnain Shabbir, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 330 days.

(21) Appl. No.: 16/244,095

(22) Filed: Jan. 9, 2019

(65) Prior Publication Data

US 2020/0218224 A1    Jul. 9, 2020

(51) Int. Cl.
*G05B 19/404*    (2006.01)

(52) U.S. Cl.
CPC .. *G05B 19/404* (2013.01); *G05B 2219/49219* (2013.01)

(58) Field of Classification Search
CPC ...... G06F 1/20; G06F 1/206; G06F 2200/201; H05K 7/20154; H05K 1/0203; H05K 7/20145; H05K 7/20209; H05K 2201/066; H05K 7/20172; Y02D 10/00; Y02D 10/126; Y02D 10/16; Y02D 10/172; Y02D 10/24; G05B 15/02; G05B 19/042; G05B 2219/49219
See application file for complete search history.

(56) References Cited

U.S. PATENT DOCUMENTS

| 5,582,240 | A | * | 12/1996 | Widmayer | ............ H01L 23/467 165/80.3 |
| 5,828,549 | A | * | 10/1998 | Gandre | ...................... G06F 1/20 361/695 |
| 10,219,365 | B1 | * | 2/2019 | Chen | ....................... H05K 1/021 |
| 2003/0218850 | A1 | * | 11/2003 | Kubo | .................... H01L 23/467 361/103 |
| 2004/0246676 | A1 | * | 12/2004 | Barr | ....................... H01L 23/467 361/697 |
| 2005/0041391 | A1 | * | 2/2005 | Wrycraft | ................... G06F 1/20 361/695 |
| 2006/0102324 | A1 | * | 5/2006 | Mok | ..................... H01L 23/467 165/104.33 |
| 2008/0041562 | A1 | * | 2/2008 | Bhatia | ................... H01L 23/467 165/80.3 |
| 2009/0083506 | A1 | * | 3/2009 | Reed | ........................ G11C 7/04 711/163 |
| 2010/0142142 | A1 | * | 6/2010 | Riebel | ................ H05K 7/20136 361/679.47 |
| 2011/0026219 | A1 | * | 2/2011 | Wiltzius | .................... G06F 1/20 361/679.47 |

(Continued)

*Primary Examiner* — Darrin D Dunn
(74) *Attorney, Agent, or Firm* — Chamberlain, Hrdlicka, White, Williams & Aughtry

(57) ABSTRACT

An information handling system includes a chassis and a payload. The chassis directs an airflow along the payload. The payload includes a heatsink for cooling a first component using a first portion of the airflow and an airflow directing heatsink for cooling a second component. The airflow directing heatsink uses both of the first portion of the airflow and a second portion of the airflow for cooling the second component.

19 Claims, 18 Drawing Sheets

(56) References Cited

U.S. PATENT DOCUMENTS

| | | | |
|---|---|---|---|
| 2011/0130891 A1* | 6/2011 | Nielsen | G06F 1/206 |
| | | | 700/300 |
| 2011/0181842 A1* | 7/2011 | Kanno | G03B 21/16 |
| | | | 353/52 |
| 2011/0292608 A1* | 12/2011 | Tan | H01L 23/467 |
| | | | 361/696 |
| 2014/0089703 A1* | 3/2014 | Starr | G06F 1/3206 |
| | | | 713/323 |
| 2016/0033974 A1* | 2/2016 | North | G06F 1/20 |
| | | | 700/300 |
| 2016/0081231 A1* | 3/2016 | Berke | G06F 1/206 |
| | | | 700/299 |
| 2016/0088775 A1* | 3/2016 | Bailey | B21D 53/022 |
| | | | 361/679.47 |
| 2016/0270254 A1* | 9/2016 | Brianese | H05K 7/20154 |
| 2016/0363968 A1* | 12/2016 | Schubert | H05K 1/0203 |
| 2017/0160775 A1* | 6/2017 | Sun | F24F 11/79 |
| 2020/0333860 A1* | 10/2020 | Ma | G06F 1/206 |

* cited by examiner

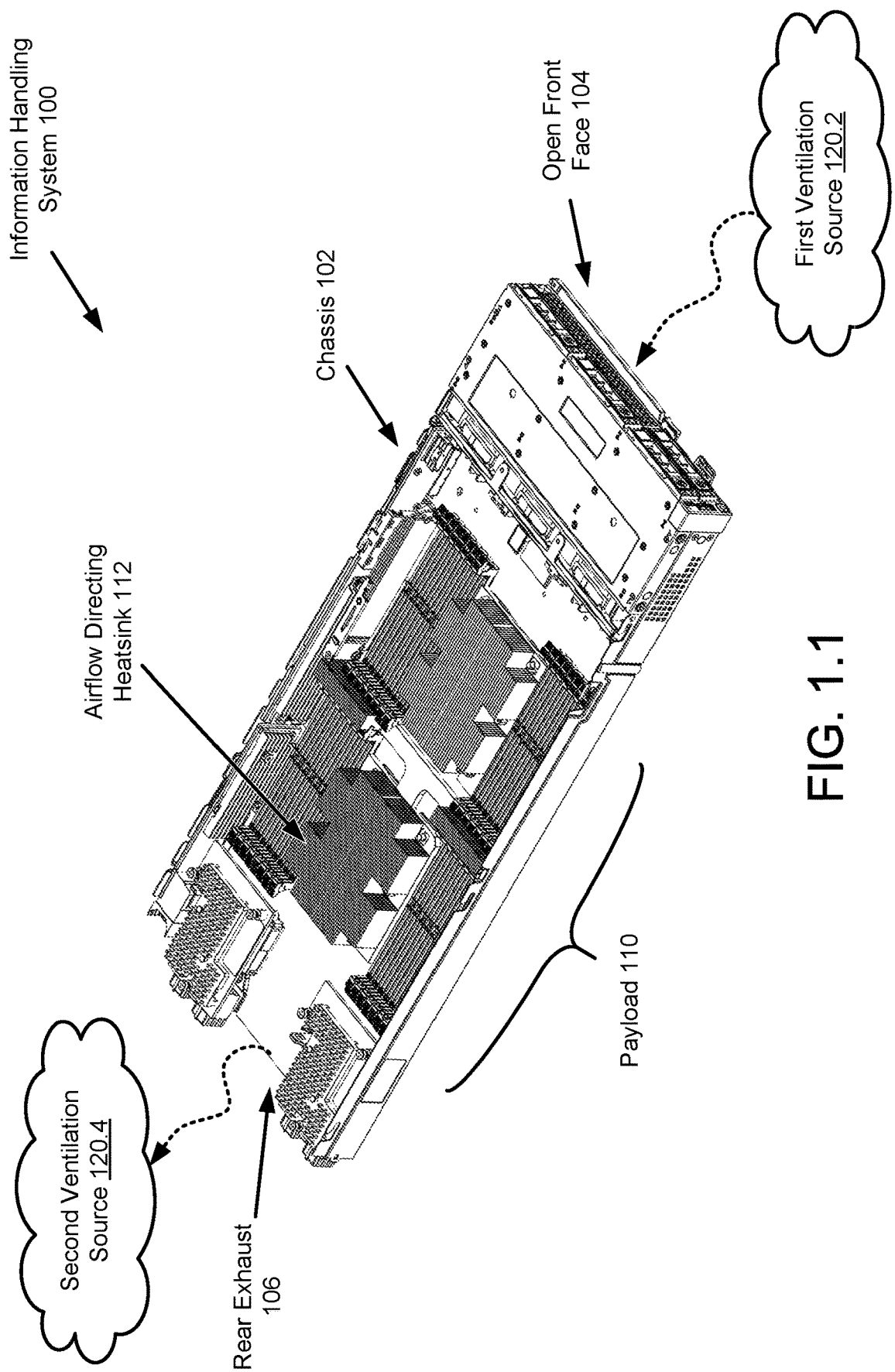
FIG. 1.1

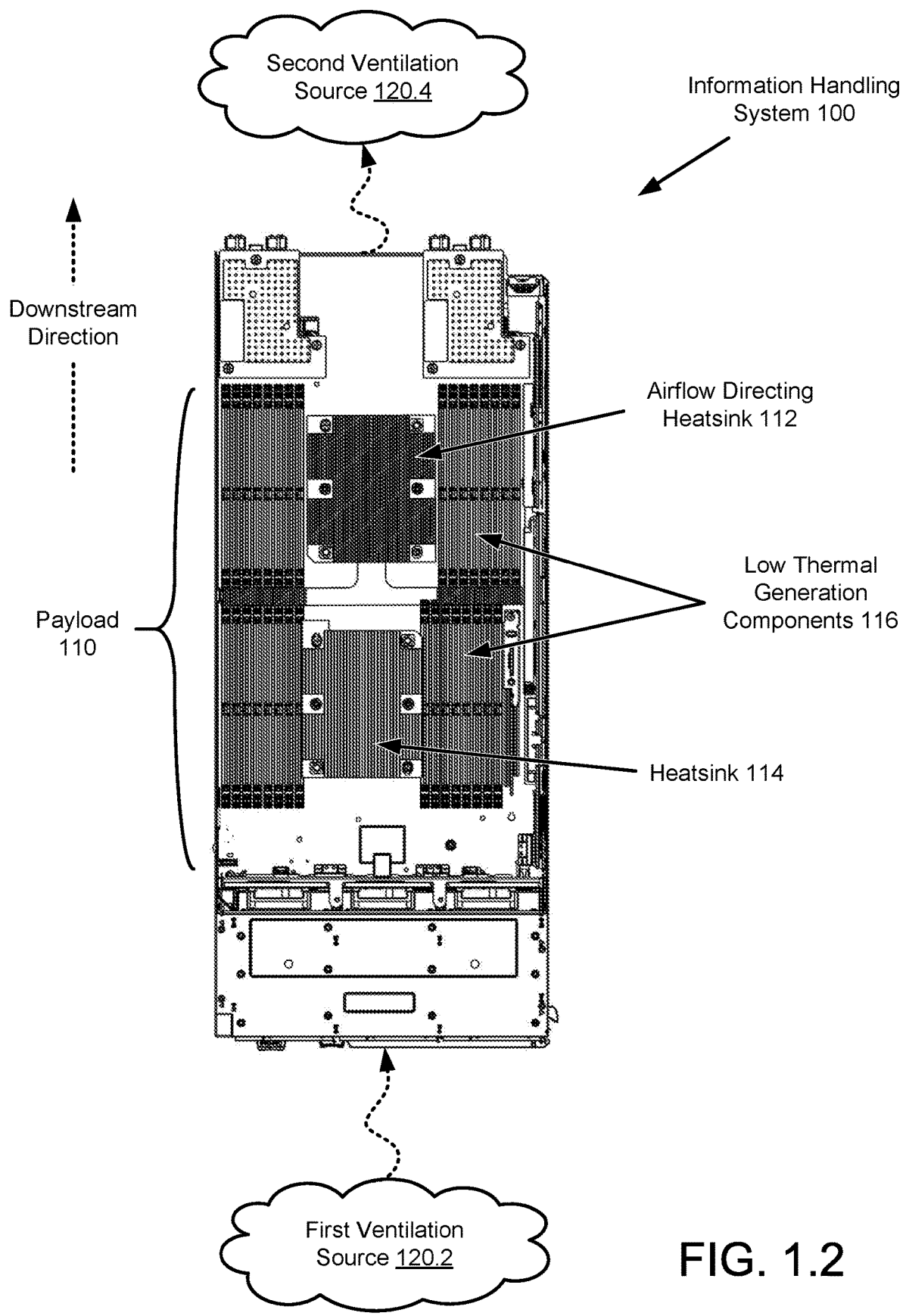
FIG. 1.2

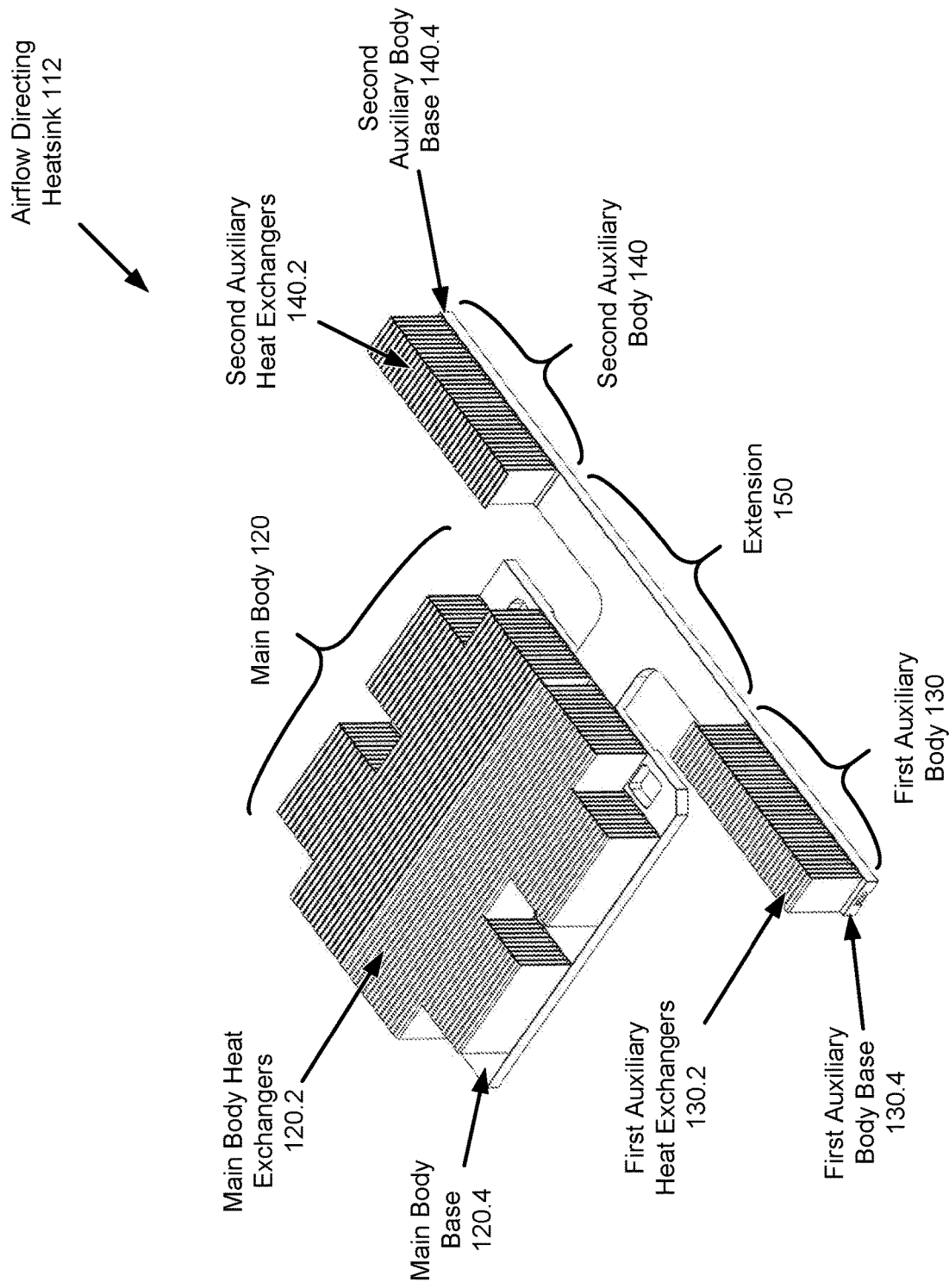
FIG. 1.3

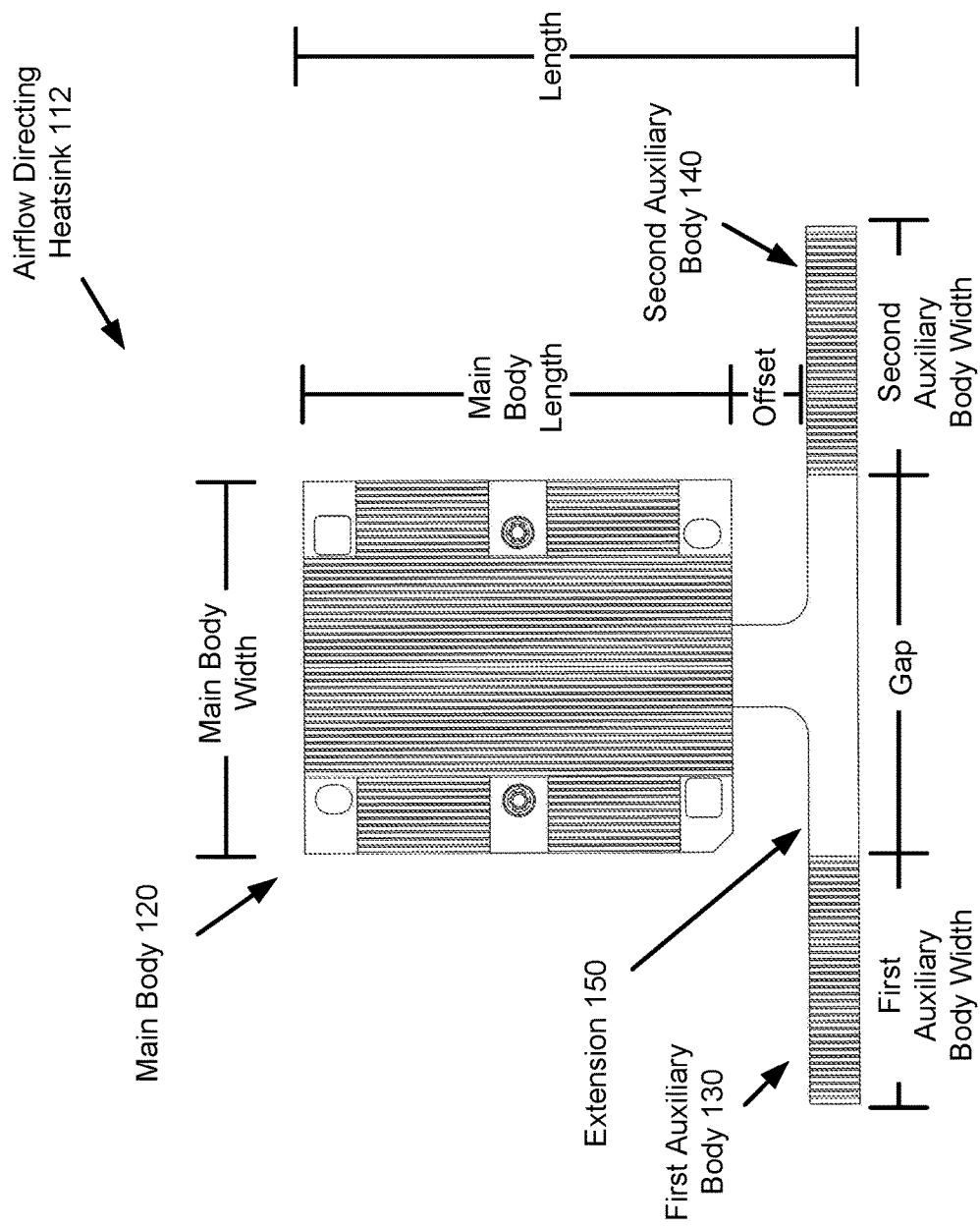
FIG. 1.4

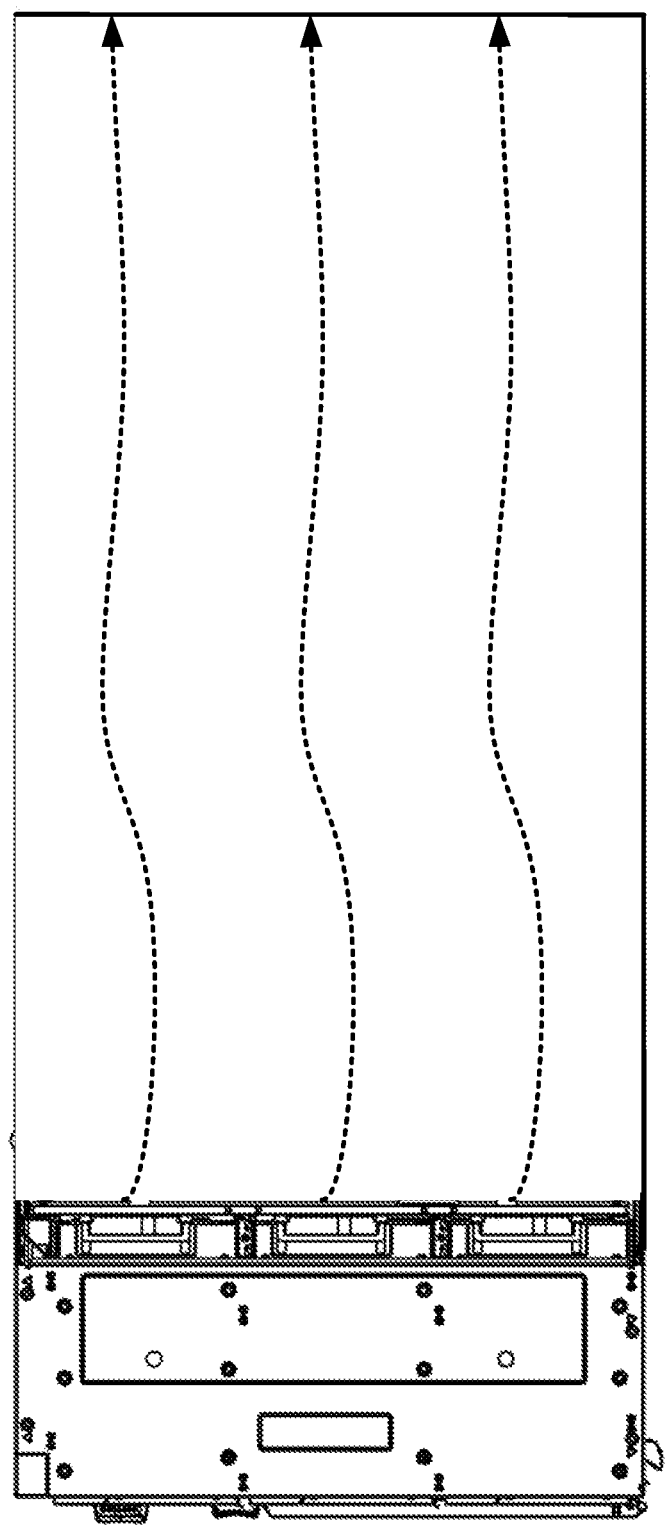
FIG. 2.1

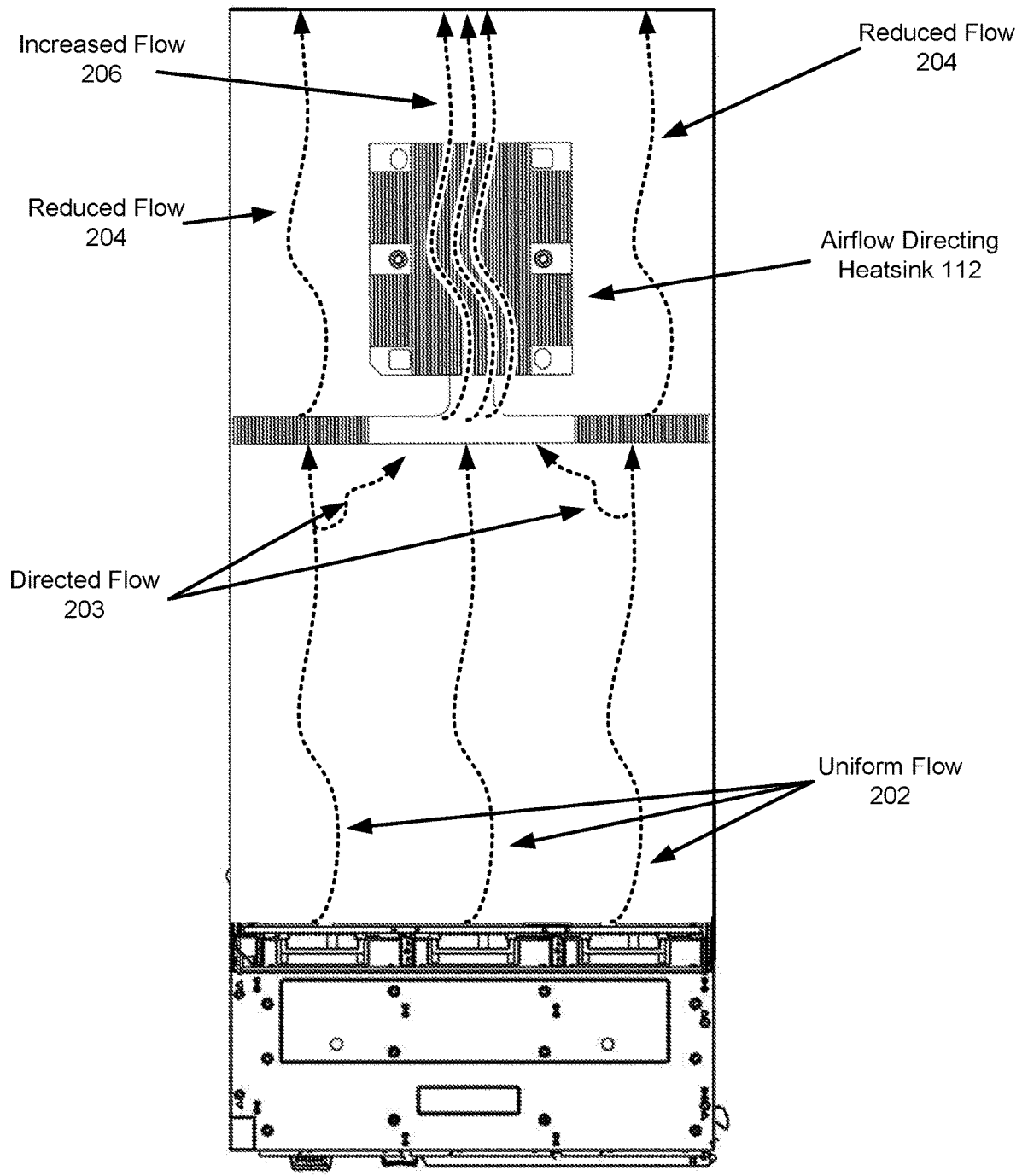
FIG. 2.2

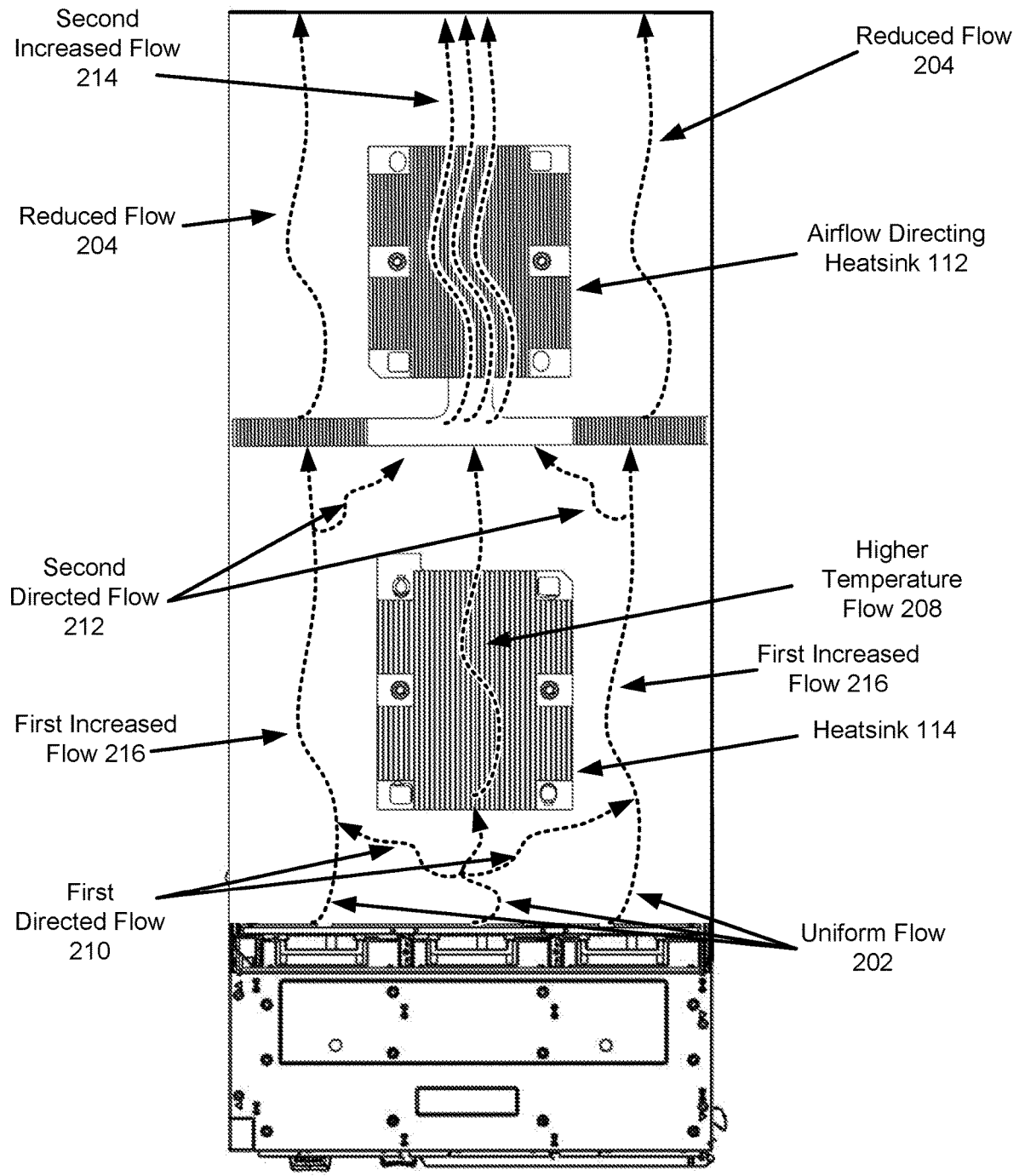
FIG. 2.3

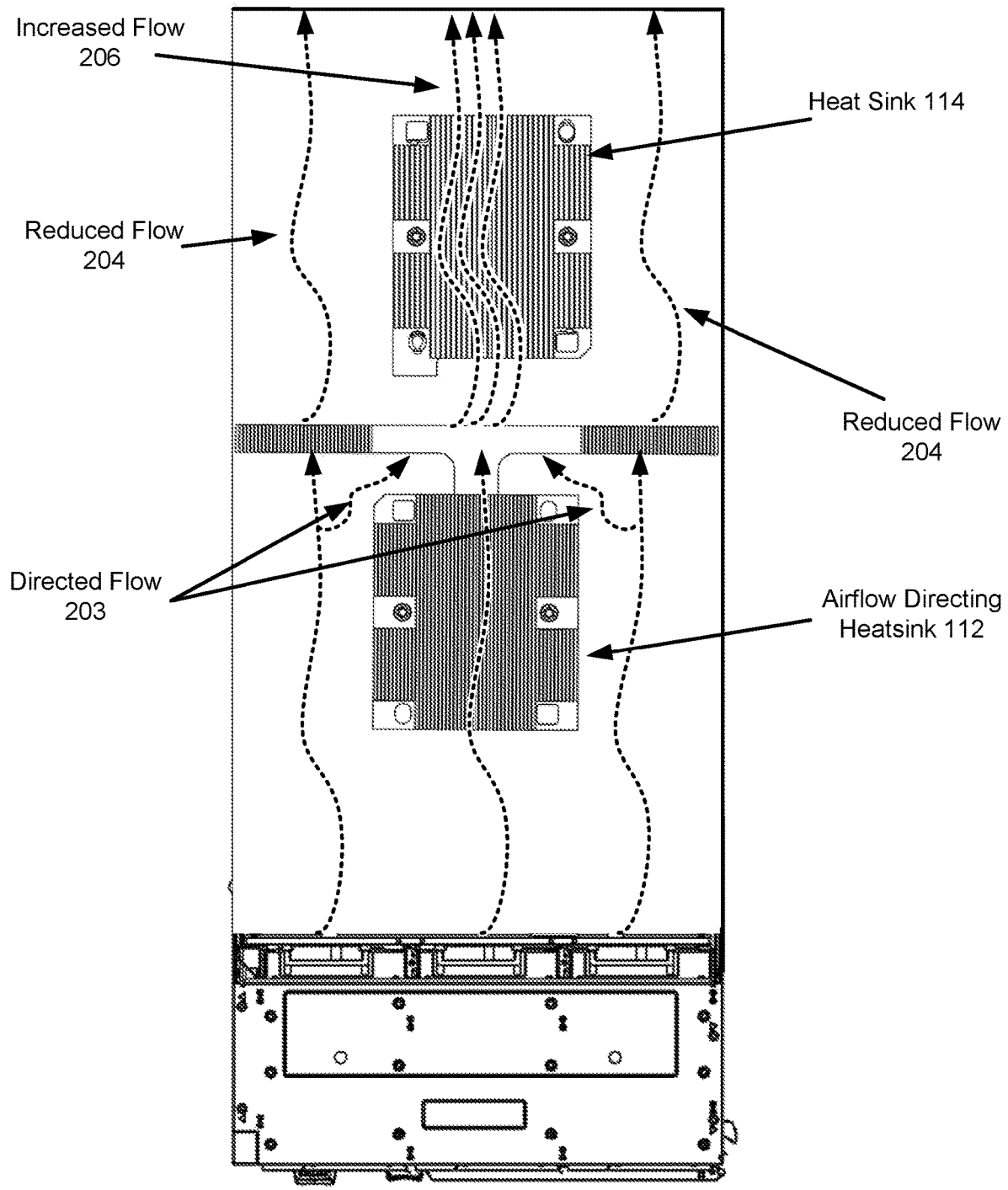
FIG. 2.4

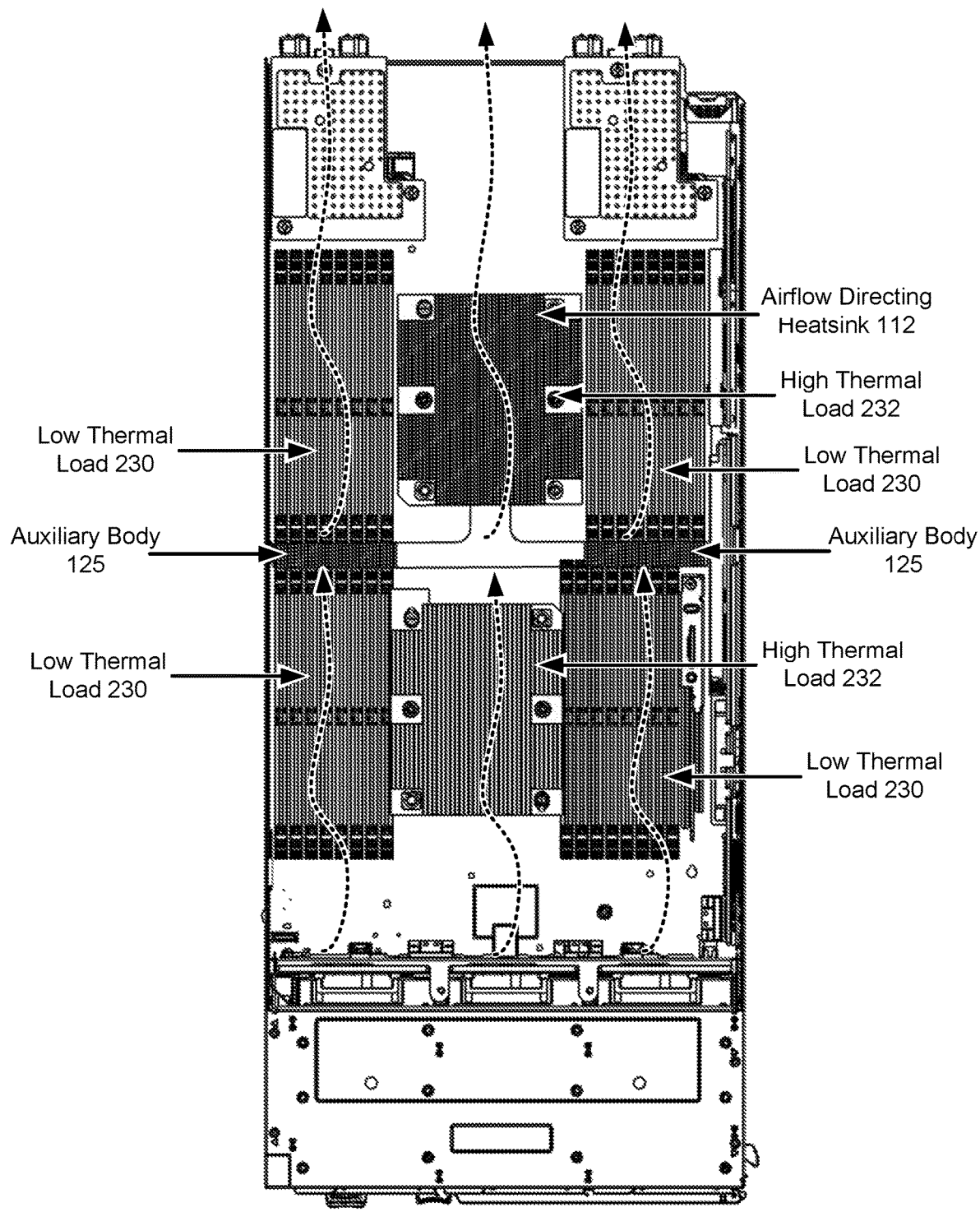
FIG. 2.5

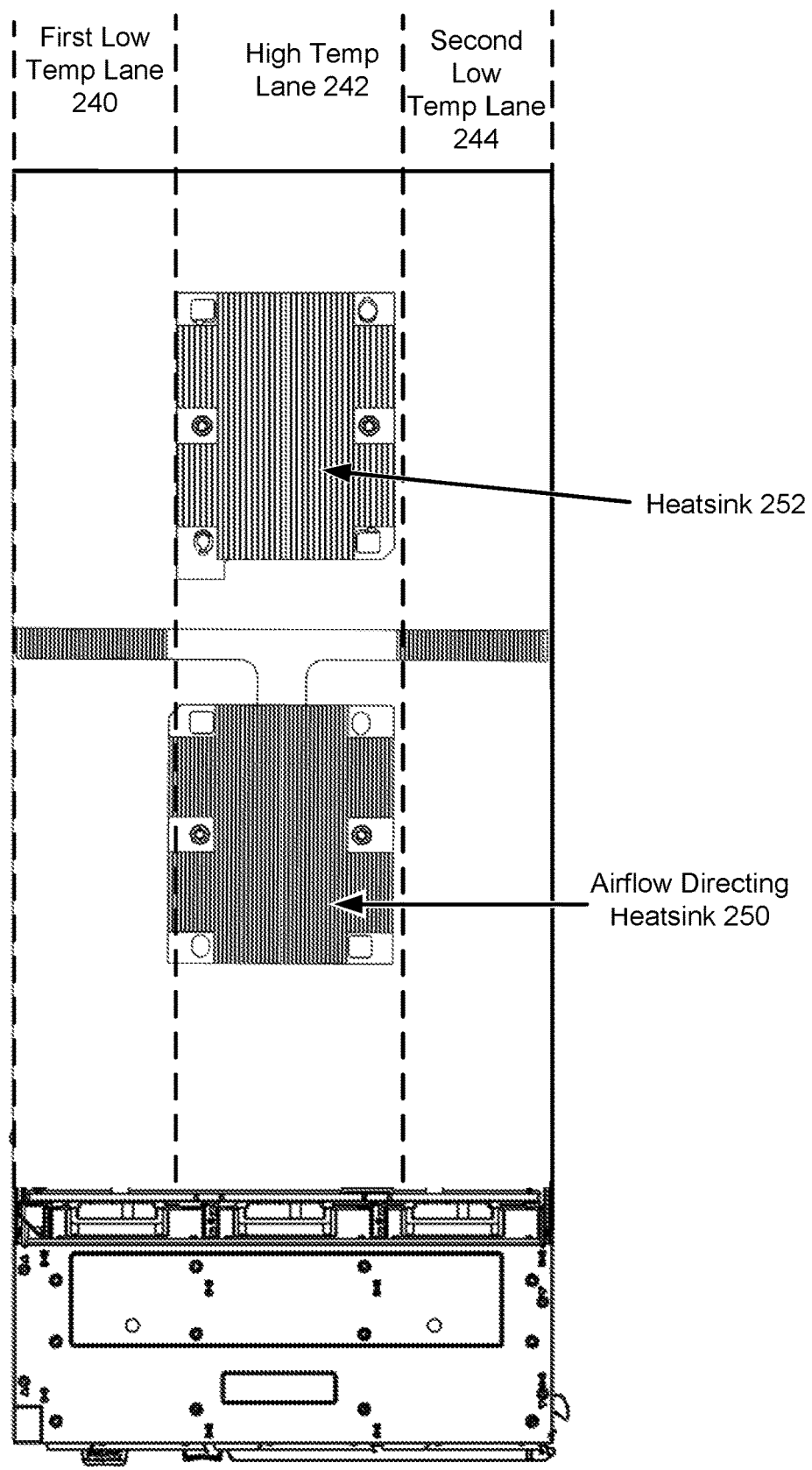
FIG. 2.6

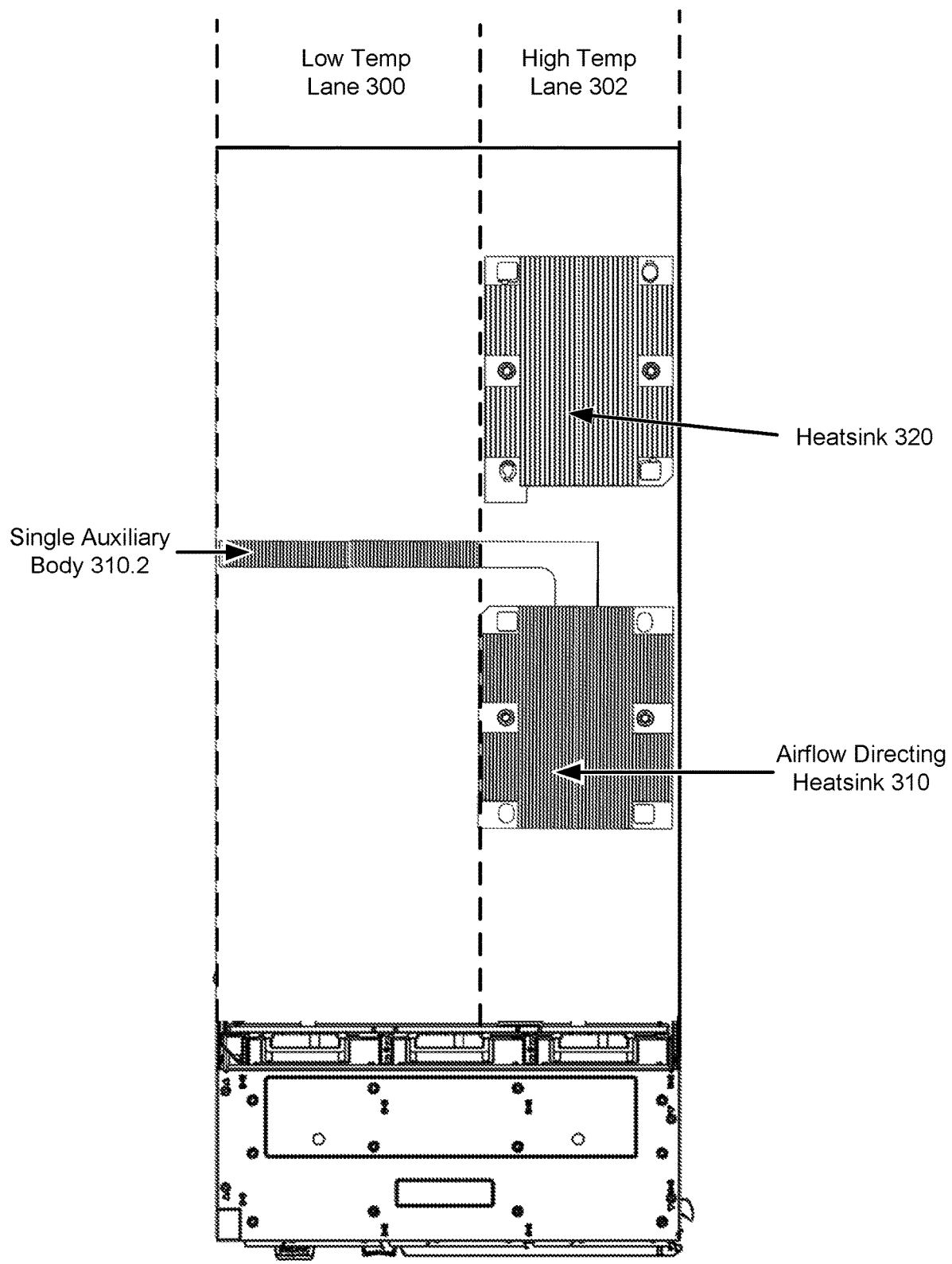
FIG. 3.1

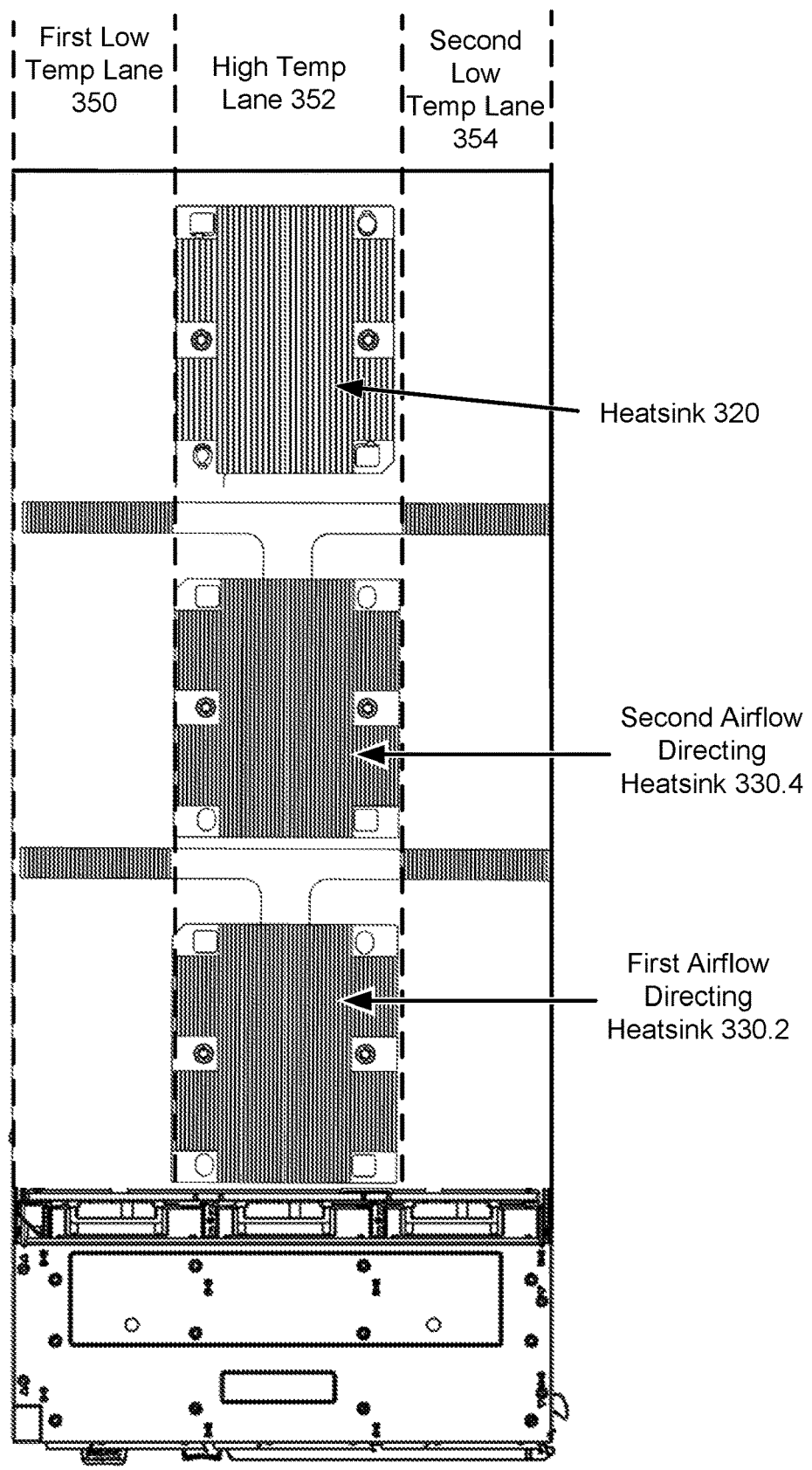
FIG. 3.2

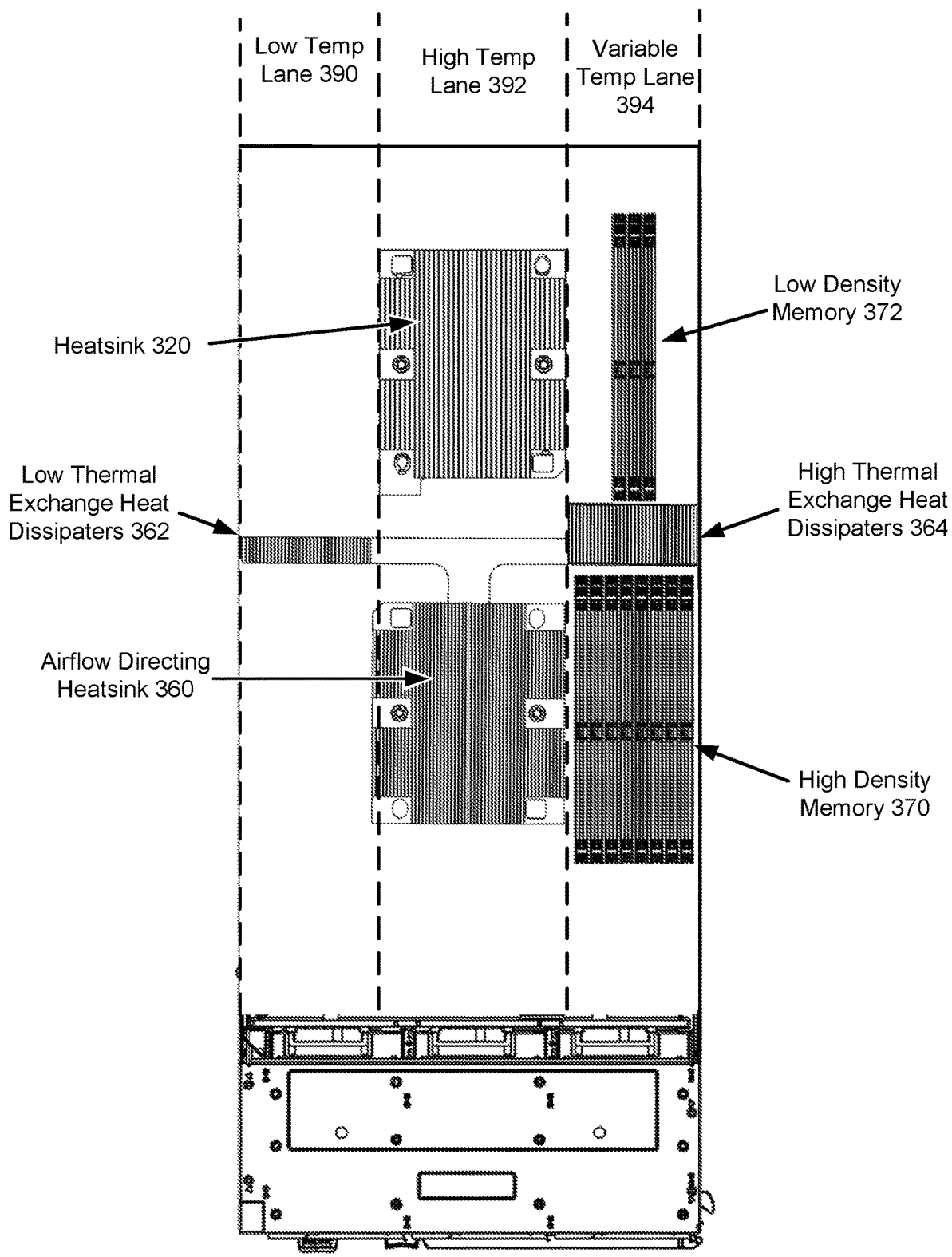
FIG. 3.3

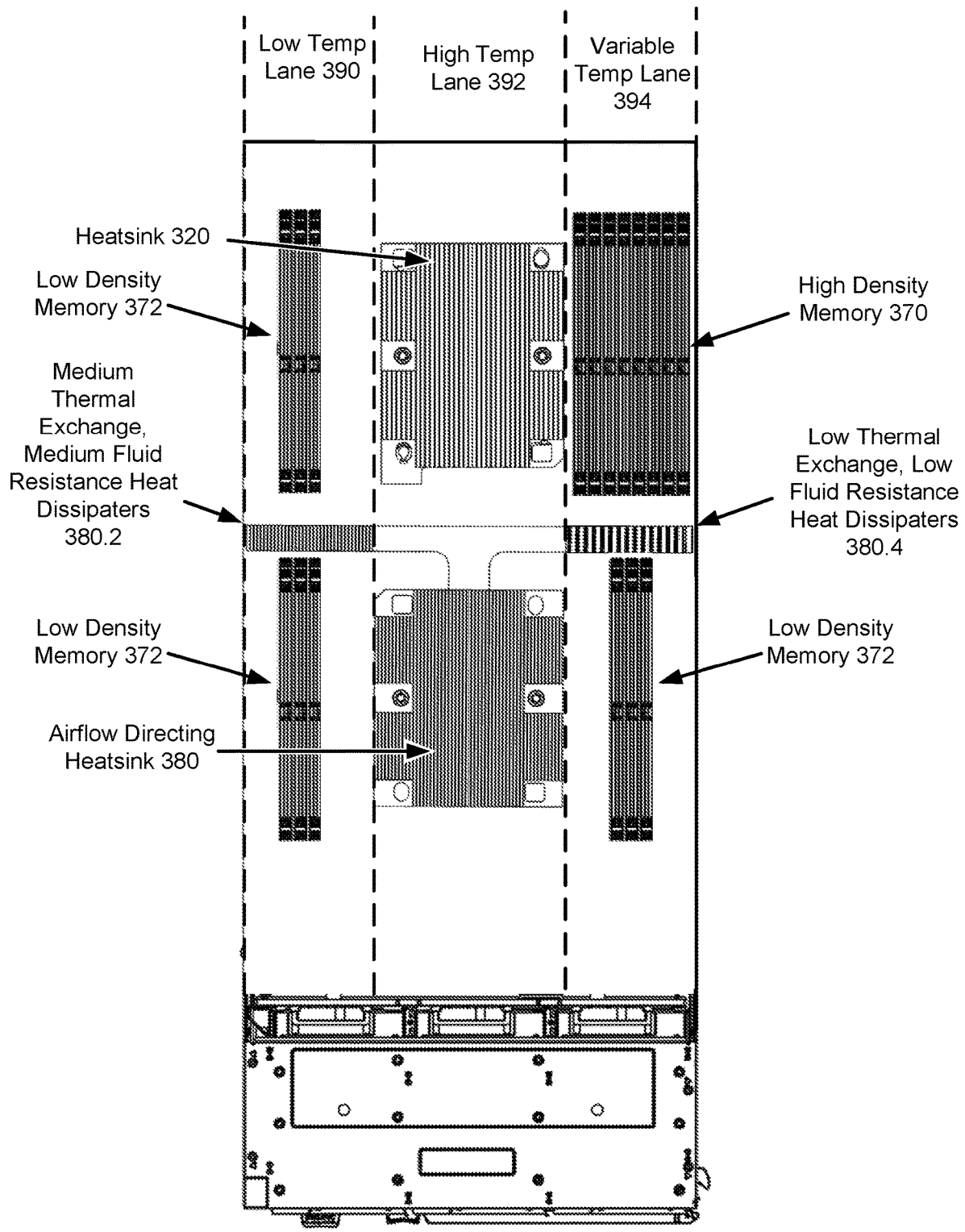
FIG. 3.4

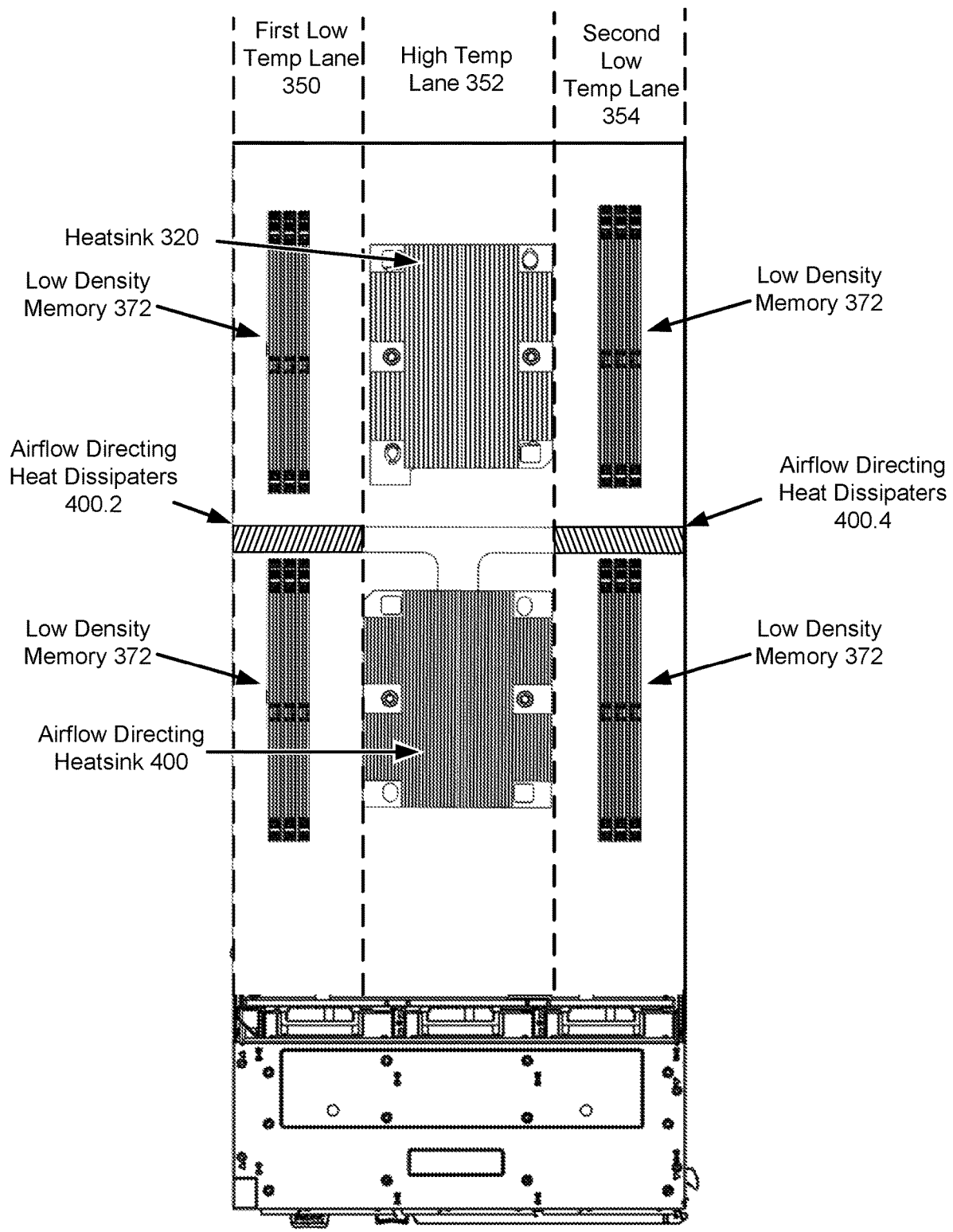
FIG. 3.5

SYSTEM AND METHOD FOR THERMAL MANAGEMENT IN A MULTICOMPONENT SYSTEM

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Hardware components may generate heat. For example, to perform computations an information handling system may include a processor. To perform the computations, the processor may utilize electricity and generate heat as part of the process of performing the computation. Other components of an information handling system may also generate heat.

SUMMARY

In one aspect, an information handling system in accordance with one or more embodiments of the invention includes a chassis and a payload. The chassis directs an airflow along the payload. The payload includes a heatsink for cooling a first component using a first portion of the airflow and an airflow directing heatsink for cooling a second component. The airflow directing heatsink uses both of the first portion of the airflow and a second portion of the airflow for cooling the second component.

In one aspect, a method for thermally managing an information handling system in accordance with one or more embodiments of the invention includes exchanging, using a heatsink, first heat from a first component with a first portion of an airflow; simultaneously, using an airflow directing heatsink: dividing a second portion of the airflow into a first sub-portion and a second sub-portion, and exchanging second heat from a second component with the first sub-portion of the second portion of the airflow; and exchanging, using the airflow directing heatsink, third heat from the second component with both of: the first portion of the airflow and the first sub-portion of the second portion of the airflow.

In one aspect, an information handling system in accordance with one or more embodiments of the invention includes a chassis and a payload. The chassis directs an airflow along the payload. The payload includes a heatsink for cooling a first component using a first portion of the airflow; and an airflow directing heatsink that cools a second component and directs the airflow to enhance a downstream flowrate of a second portion of the airflow proximate to a high thermal load component.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows an isometric diagram of an information handling system in accordance with one or more embodiments of the invention.

FIG. 1.2 shows a top-view diagram of the information handling system of FIG. 1.1.

FIG. 1.3 shows an isometric diagram of an airflow directing heatsink in accordance with one or more embodiments of the invention.

FIG. 1.4 shows a top-view diagram of the airflow directing heatsink of FIG. 1.3.

FIG. 2.1 shows a first airflow diagram of an information handling system in accordance with one or more embodiments of the invention.

FIG. 2.2 shows a second airflow diagram of an information handling system in accordance with one or more embodiments of the invention.

FIG. 2.3 shows a third airflow diagram of an information handling system in accordance with one or more embodiments of the invention.

FIG. 2.4 shows a fourth airflow diagram of an information handling system in accordance with one or more embodiments of the invention.

FIG. 2.5 shows a fifth airflow diagram of an information handling system in accordance with one or more embodiments of the invention.

FIG. 2.6 shows a sixth airflow diagram of an information handling system in accordance with one or more embodiments of the invention.

FIG. 3.1 shows an airflow diagram of a second information handling system in accordance with one or more embodiments of the invention.

FIG. 3.2 shows an airflow diagram of a third information handling system in accordance with one or more embodiments of the invention.

FIG. 3.3 shows an airflow diagram of a fourth information handling system in accordance with one or more embodiments of the invention.

FIG. 3.4 shows an airflow diagram of a fifth information handling system in accordance with one or more embodiments of the invention.

FIG. 3.5 shows an airflow diagram of a sixth information handling system in accordance with one or more embodiments of the invention.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Figure 6:
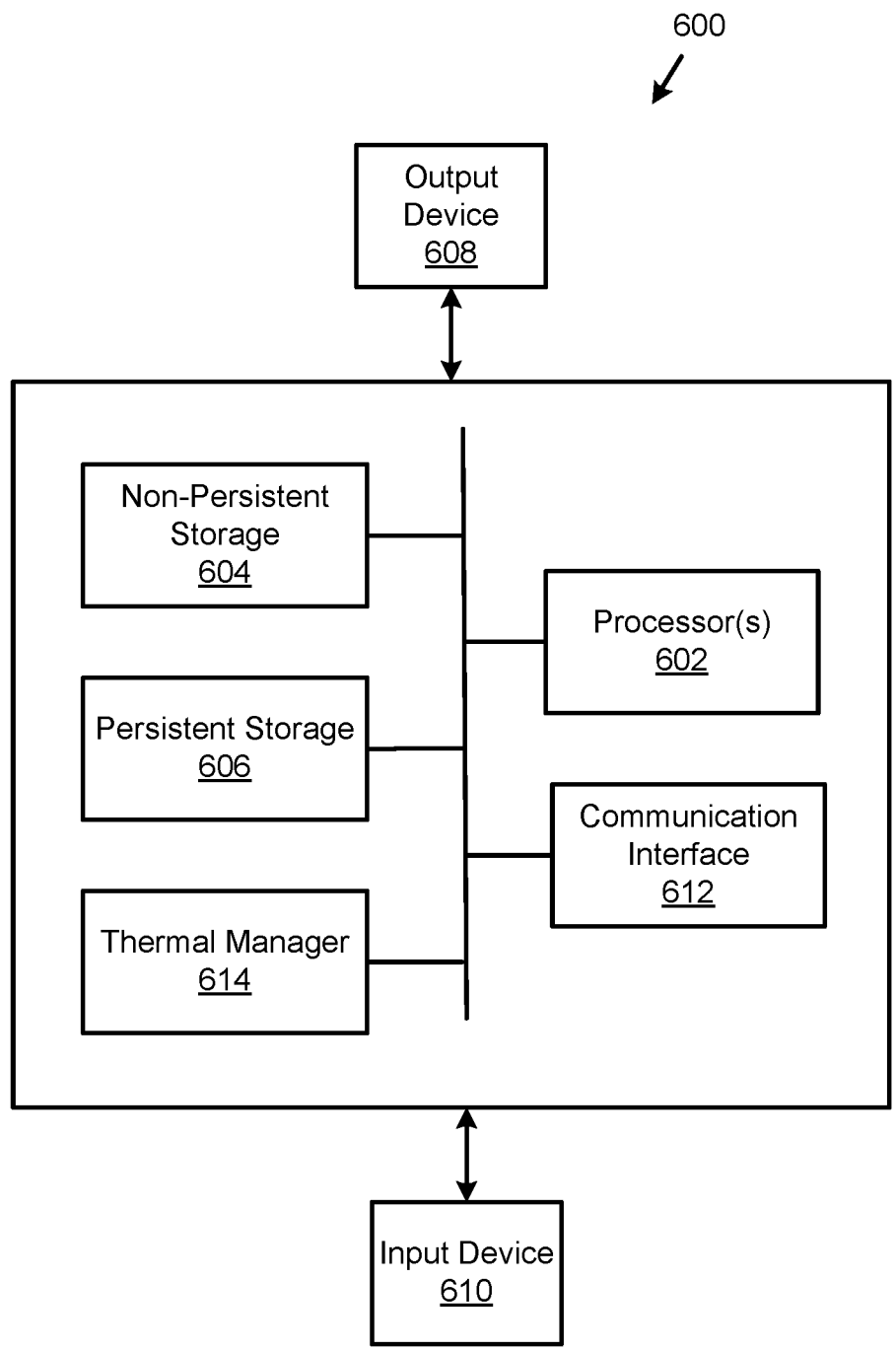
FIG. 6 shows a diagram of a computing device in accordance with one or more embodiments of the invention.

In general, embodiments of the invention relate to systems, devices, and methods for managing thermal loads in information handling systems. For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a computing device such as a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. An example diagram of a computing device is shown in FIG. 6. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

In one or more embodiments of the invention, an information handling system includes an airflow directing heatsink. The airflow directing heatsink may be disposed within a chassis of an information handling system. When disposed in the chassis, the airflow directing heatsink may both dissipate heat generated by one or more components in the information handling system using an airflow within the chassis and direct a portion of the airflow within the chassis. By both exchanging heat and directing the airflow within the chassis, information handling systems in accordance with embodiments of the invention may provide improved thermal management for components disposed within the chassis when compared to contemporary computing devices.

In one or more embodiments of the invention, the airflow directing heatsink increases airflow proximate to a heatsink that dissipates a thermal load generated by a component. By increasing the airflow proximate to the heatsink, the heatsink may more effectively dissipate the thermal load generated by the component when compared with scenarios in which the airflow is not increased by the airflow directing heatsink. Thus, embodiments of the invention may provide an improved information handling system when compared to contemporary computing devices.

In the following figures, an information handling device is illustrated in a manner where some components are not shown. For example, a top cover of a chassis or internal components of the information handling device may not be included in the figures to highlight features of embodiments of the invention. One of ordinary skill in the art will appreciate that an information handling device in accordance with embodiments of the invention may include additional components than those illustrated in the following figures.

FIG. 1 shows an example system in accordance with one or more embodiments of the invention. The system may include an information handling system (100). The information handling system (100) may be a physical computing device. The information handling system (100) may have a form factor that enables it to be utilized in a high-density computing environment. The information handling system (100) may be used in other types of computing environments without departing from the invention.

In one or more embodiments of the invention, the information handling system (100) includes a chassis (102). The chassis (102) may be a physical device for (i) housing the payload (110) and (ii) directing an airflow from a first ventilation source (120.2) to a second ventilation source (120.4) along the payload (110). The airflow may be utilized by the payload (110) to thermally manage the payload. For example, components of the payload (110) may generate heat that is exchanged with the airflow to manage the temperatures of the components.

In one or more embodiments of the invention, the chassis (102) is a rackmount case for housing computing components. The chassis (102) may include an open front face (104) to receive the airflow from the first ventilation source (120.2) and a rear exhaust (106) to exhaust the airflow into the second ventilation source (120.4). For example, as illustrated by the arrows with dashed tales in FIG. 1.1, the airflow may enter the open front face (104) of the chassis (102) and may be exhausted from the rear exhaust (106) of the chassis (102). Alternatively, the direction of the airflow as illustrated in FIG. 1.1 may be reversed without departing from the invention.

In one or more embodiments of the invention, the payload (110) includes any number of components housed by the chassis (102). Components may include any number of physical computing devices. For example, the physical computing devices may be processors, memory devices, storage devices, communication devices, and/or any other type of physical computing device. In addition to the physical computing devices, components may include thermal management devices for managing thermal load of physical computing devices. For example, the thermal management devices may exchange heat generated by physical computing devices with the airflow within the chassis (102). By doing so, the temperature of each of the components may be regulated within a predetermined range when information handling system (100) is operating nominally.

In one or more embodiments of the invention, the payload (110) includes an airflow directing heatsink (112), i.e., one of the thermal management devices. The airflow directing heatsink (112) may be a physical component for managing the thermal load of one or more components of the payload (110). The airflow directing heatsink (112) may manage the thermal load of one or more components by (i) exchanging heat generated by the one or more components with airflow within the chassis (102) and (ii) direct one or more portions of the airflow within the chassis (102). By directing the one or more portions of the airflow within the chassis (102), the airflow directing heatsink (112) may provide improved thermal management of the components of the payload (110) when compared with contemporary methods of managing the thermal load of physical computing devices. For additional details regarding the airflow directing heatsink (112), refer to FIGS. 1.3-1.4.

While the payload (110) has been described as including a limited number of components, the payload (110) may include additional, different, and/or fewer components without departing from the invention. For example, the payload (110) may include any number of physical computing devices such as mainboards/mother boards for interconnecting the components of the payload (110). In another example, the payload (110) may include any number of hardware devices such as clips, mounts, extensions, etc. for positioning components of the payload (110) within the chassis (102). In a still further example, the payload (110) may include fans or other airflow control devices for generating and/or supplementing the airflow within the chassis. In such a scenario, the payload (110) may include a thermal manager that controls active devices such as fans for managing the thermal load of the payload (110).

In one or more embodiments of the invention, the information handling system (100) is a computing device. The computing device may be, for example, a server. The computing devices may include one or more processors, memory (e.g., random access memory), and persistent storage (e.g., disk drives, solid state drives, etc.) as the payload (110). The information handling system (100) may be other types of computing devices without departing from the invention. For additional details regarding computing devices, refer to FIG. 6.

To further clarify aspects of embodiments of the invention, a top-view diagram of the information handling system (100) in accordance with one or more embodiments of the invention is shown in FIG. 1.2. As shown in FIG. 1.2, the payload (110) may include multiple heatsinks (112, 114) that manages thermal loads generated by high thermal generation components (not shown but disposed below airflow directing heatsink (112) and/or heatsink (114)). The multiple heatsinks (112, 114) may be thermally connected to the high thermal generation components. For example, each of the multiple heatsinks (112, 114) may be clipped or otherwise mechanically attached to corresponding high thermal generation components. By doing so, heat generated by the high thermal generation components may be conducted into the corresponding multiple heatsinks (112, 114) and exchanged with the airflow within the chassis thereby managing the thermal load generated by the high thermal generation components.

In one or more embodiments of the invention, the payload (110) includes both low and high thermal generation components. The low thermal generation components (116) may generate less heat when compared with the quantity of heat generated by the high thermal generation components (potentially disposed below the heatsinks). For example, the high thermal generation components may be processors while the low thermal generation components (116) may be memory modules, storage modules, or other types of physical devices. The memory modules may be, for example, dual inline memory modules (DIMM) or other types of memory.

The arrangement of the high thermal generation components (not shown) and the low thermal generation components (116) within the chassis may impact the ability of each of the heatsinks (112, 114) and other components to manage the thermal load of the corresponding components to which the heatsinks (112, 114) are thermally connected. For example, consider a scenario as illustrated in FIG. 1.2 where an airflow is received from the first ventilation source (120.2), traverses the interior of the chassis from the bottom to the top, and exhausts from the chassis into the second ventilation source (120.4). In this scenario, as the airflow traverses the interior of the chassis the heatsinks (112, 114) exchange heat with the airflow consequently changing the temperature of the airflow as it traverses the chassis. As the temperature of the airflow increases due to the heat exchanges, downstream components (upward on the page in FIG. 1.2 as indicated by the arrow with the straight dashed tail) are less able to exchange heat with the airflow due to the increased temperature of the airflow. In other words, because the difference in temperature between the airflow and heatsinks significantly impacts the amount of heat exchanged between the heatsinks and the airflow, heatsinks that are in locations in the chassis where the temperature of the airflow has increased are less able to exchange heat with the airflow.

Additionally, the arrangement of the heatsinks (112, 114) within the chassis may impact the airflow within the chassis. For example, the heatsinks (112, 114) each have an impedance to the flow of air that causes reduced airflow directly in line with the heatsinks (112, 114) downstream. Thus, in addition to temperature variation of the airflow along the length of the chassis, airflow volume may not be uniform across the width of the chassis and may vary along the length of the chassis. For example, the airflow across the width of the chassis near the heatsink (114) may be increased away from the heatsink (114) and reduced along the heatsink (114) because of the fluid impedance of the heatsink (114).

Embodiments of the invention may address the above noted thermal management issues and other issues by managing airflow across the width of the chassis. Specifically, embodiments of the invention may provide a heatsink that both exchanges heat with multiple portions of an airflow across the width of the chassis and directs the airflow within the chassis by modulating the fluid impedance across the width of the chassis. An airflow directing heatsink (112) in accordance with embodiments of the invention may be utilized. For additional details regarding the airflow directing heatsink (112), refer to FIGS. 1.3 and 1.4.

FIGS. 1.3 and 1.4 show an isometric diagram and a top-view diagram, respectively, of an airflow directing heatsink (112) in accordance with one or more embodiments of the invention. The airflow directing heatsink (112) may be a physical device for managing the thermal load of one or more components. For example, the airflow directing heatsink (112) may be adapted to be thermally connected to a high thermal load component. The airflow directing heatsink (112) may receive heat from the high thermal load component via the thermal connection and dissipate received heat by exchanging heat with an airflow proximate to the airflow directing heatsink (112). The airflow directing heatsink (112) may include receivers for mounting clips, bolts, or other mechanical connectors for mechanically connecting the airflow directing heatsink (112) to the high thermal load component.

Additionally, the airflow directing heatsink (112) may be adapted to control the airflow within a chassis. For example, the airflow directing heatsink (112) may have a shape that modulates the fluid impedance across the width of the chassis when the airflow directing heatsink (112) is disposed within the chassis. By doing so, the airflow directing heatsink (112) may control the airflow within the chassis to preferentially cause selected portions of the airflow to be directed towards desired locations. As will be discussed in greater detail below, the airflow directing heatsink (112) may be used to preferentially direct portions of the airflow towards high thermal load components and, thereby, improve the ability of heatsinks thermally connected to the high thermal load components to exchange heat with the airflow within the chassis.

In one or more embodiments of the invention, the airflow directing heatsink (112) includes a main body (120) and one or more auxiliary bodies (e.g., 130, 140). Each of these bodies (e.g., 120, 130, 140) may provide heat exchange capabilities and/or airflow directing capabilities. For example, each of the bodies (e.g., 120, 130, 140) may include heat exchanges (e.g., 120.2, 130.2, 140.2) that facilitate the exchange of heat with an airflow.

The heat exchangers, separately or in combination with other portions of the airflow directing heatsink (112), may also direct portions of an airflow proximate to the airflow directing heatsink (112). For example, the heat exchangers may present a spatially varying fluid impedance to the airflow that causes the airflow to be directed in a desired manner. With reference to FIG. 1.3, if the airflow is directed from the bottom right to the top left of the page (bottom to top of the page in FIG. 1.4), the airflow may be concentrated in the gap between the first auxiliary body (130) and the second auxiliary body (140) because of the spatially varying fluid impedance of the airflow directing heatsink (112). By directing portions of the airflow, a higher flow rate of the airflow may be directed proximate to the main body (120) improving the ability of the main body (120) to exchange heat with the airflow compared to a scenario in which neither of the first auxiliary body (130) and the second auxiliary body (140) are present. For additional details regarding directing of airflows via the airflow directing heatsink (112), refer to FIGS. 2.1-2.6.

In one or more embodiments of the invention, the heat exchangers (120.2, 130.2, 140.2) are physical devices adapted to exchange heat with an airflow proximate to the heat exchangers. The heat exchangers may be, for example, an array of fins, pins, troughs, tubes, passages, or other physical structures (or combinations of structures). For example, in FIG. 1.3, the heat exchangers are illustrated as array of longitudinal metal structures (i.e., structures that have a cross section that does not vary in one dimension) each having a cross section in the shape of the letter C. The array of longitudinal metal structures may be placed adjacent to each other to form tubes. By forming tubes, airflow proximate to the heat exchangers may be channeled through the tubes thereby causing heat exchange between the heat exchangers and the airflow. While the heat exchangers have been illustrated as being an array of longitudinal metal structures, the heat exchangers or elements of the heat exchangers may have other shapes without departing from the invention.

The heat exchangers may be formed from any thermally conductive material such as, for example, aluminum, copper, steel, or metal alloys of these and/or other metals. While the heat exchangers are illustrated as included a limited number of elements, the heat exchangers may include additional, fewer, and/or different components from those illustrated in FIG. 1.3. For example, the heat exchangers may include retention devices such as clips or brackets to maintain the position of the heat exchangers in a scenario in which the elements of the heat exchangers are not rigidly attached via braising or other method to each other and/or other components such as bases, discussed below.

In one or more embodiments of the invention, each of the heat exchangers is disposed on a corresponding base (e.g., 120.4, 130.4, 140.4). Each of the bases may be a physical structure for conducting heat. For example, the bases may be metallic, or other thermally conductive structures. By conducting heat, heat from a high thermal load component may be transmitted to the heat exchangers for dissipation in airflow proximate the airflow directing heatsink (112). The bases may be formed from any thermally conductive material such as, for example, aluminum, copper, steel, or metal alloys of these and/or other metals.

In one or more embodiments of the invention, the auxiliary bases (130.4, 140.4) are attached to the main body base (120.4) by one or more extensions. An extension (e.g., 150) may be a physical structure that (i) positions the auxiliary bodies (130, 140) with respect to the main body (120) and (ii) provides thermal conduction path between each of the bases. The extension (150) may be formed from any thermally conductive material such as, for example, aluminum, copper, steel, or metal alloys of these and/or other metals. As will be discussed in greater detail below with respect to FIG. 1.4, the extension (150) may position the auxiliary heat exchangers (e.g., 130.2, 140.2) in a manner that directs airflow towards either the main body heat exchangers (120.2) or another heatsink.

The thickness of each respective base (e.g., 120.4, 130.4, 140.4), the height of the heat exchangers (120.2, 130.2, 140.2), and other characteristics of the heat exchangers (density, length, shape, etc.) may be set to control (i) the airflow impedance and (ii) thermal exchange of each portion of the airflow directing heatsink (112). For example, to increase the thermal exchange of the main body heat exchangers (120.2) the density of the individual elements may be increased (consequently resulting in a cross section that includes a higher material fill factor that impedes airflow through the main body heat exchangers). As will be discussed with respect to FIGS. 3.4-3.5, these characteristics of the airflow directing heatsink (112) may be tailored in a manner to improve the thermal management ability of an information handling device. In one or more embodiments of the invention, the total height of the bases and heat exchangers is the same or similar (e.g., within 5%) to height of the interior of a chassis in which the airflow directing heatsink (112) is to be disposed.

In one or more embodiments of the invention, the bases (120.4, 130.4, 140.4) and the extension (150) include a heat pipe or other thermal transport structure. The heat pipe may improve the thermal transport between the bases to facilitate dissipation of heat from a high thermal load component. For example, only a portion of the bases (i.e., the main body base (120.4)) may be in direct contact with the high thermal load component.

Turning to FIG. 1.4, the extension (150) may enable the auxiliary bodies (130, 140) to be positioned with respect to the main body (120). By doing so, the airflow proximate to each of the bodies may be tailored to (i) increase the heat exchange rate of the airflow directing heatsink (112) and (ii)

reduce the fluid impedance of the airflow directing heatsink (112) and/or the fluid impedance of other elements of an information handling system. By doing so, the load on active components such as fans or other airflow generated devices may be decreased. Consequently, the quantity of powered utilized for generating or supplementing an airflow may be reduced when compared to contemporary devices. Alternatively, high thermal load components such as faster processors may be utilized while still providing sufficient cooling to enables the high thermal load components to operate.

For example, by including the auxiliary bodies (130, 140), the heat exchange of the airflow directing heatsink (112) may be higher than that of a traditional heatsink. The airflow directing heatsink (112) may provide the higher heat exchange capability by (i) preferentially directing airflow and (ii) exchanging heat with cooler portions of an airflow within a chassis.

To further clarify airflow and heat exchange in accordance with embodiments of the invention, FIGS. 2.1-2.6 illustrated top-view diagrams of a chassis in accordance with embodiments of the invention with various components disposed within the chassis. In each of FIGS. 2.1-2.6, it is assumed that an airflow is directed within the chassis from the bottom of the page (e.g., front of the chasses) to the top of the page (e.g., rear of the chassis). However, one of ordinary skill in the art will appreciate that the airflow may be directed in the opposite direction without departing from the invention. Additionally, in FIGS. 2.1-2.6, airflows are illustrated as arrows having dashed tails.

FIG. 2.1 shows a top-view diagram of a chassis in accordance with one or more embodiments of the invention. As seen in FIG. 2.1, the chassis is empty. That is, a payload is not disposed in the chassis. In this configuration, the airflow is directed from the bottom to the top of the page as illustrated by the arrows. The airflow is uniform both along the length of the chassis (bottom to top of page) and across the width of the interior of the chassis (horizontal).

FIG. 2.2 shows a top-view diagram of the chassis of FIG. 2.1 with an airflow directing heatsink disposed within the chassis. When the airflow directing heatsink is disposed within the chassis, the airflow within the chassis is modified. When airflow initially enters the chassis, the airflow is a uniform flow (202) across the width of the chassis. However, when airflow reaches the airflow directing heatsink, portions of the airflow near the auxiliary bodies are redirected as directed flow (203) towards the gap between the auxiliary bodies, as opposed to through the auxiliary bodies and downstream of the auxiliary bodies. Consequently, the directed flow (203) cause (i) an increased flow (206) downstream of the gap between the auxiliary bodies and (ii) reduced flow (204) downstream of the auxiliary bodies. Because the main body of the airflow directing heatsink is disposed downstream of the gap, the increased flow (206) interacts with the main body heat exchangers thereby improving the heat exchange of the main body heat exchanger when compared to the heat exchange that what occur in the absence of the auxiliary bodies.

FIG. 2.3 shows a top-view diagram of the chassis of FIG. 2.2 with a heatsink disposed within the chassis and upstream of the gap between the auxiliary bodies. When the heatsink is added, the airflow within the chassis changes when compared to that of FIG. 2.2. First directed flows (210) occur because of the presence of the heatsink (114) which causes first increased flow (216) around the heatsink (114). Second, the portions of the airflow that traverse proximate to the heatsink (114) are a higher temperature flow (208) due to the heat exchange of the heatsink (114) with the flow. Third, when the second directed flow (212) combines with the higher temperature flow (208), a second increased flow (214) is generated but at a higher temperature than the increased flow of FIG. 2.2 due to the higher temperature of the higher temperature flow (208).

In this topology, a number of degrees of design freedom are provided to effectively provide thermal management services to high temperature components managed by the airflow directing heatsink (112) and the heatsink (114). First, the impedance of the auxiliary bodies of the airflow directing heatsink (112) may be increased or decreased to modify the flow rate of the second increased flow (214). By doing so, the heat exchange of the main body of the airflow directing heatsink (112) may be directly modified to a desired rate. Similarly, the impedance of the main body of the airflow directing heatsink (112) may be modified to modify the heat exchange rate of the main body. For example, as the density of the elements of the heat exchanger of the main body increase, the heat exchanger's heat exchange rate increases along with its fluid impedance.

Second, the impedance of the heatsink (114) may be increased or decreased to modify heat exchange of heatsink (114). In contrast to contemporary systems, embodiments of the invention may automatically compensate for the first increased flow (206), which would decrease the thermal exchange rate of a traditional heatsink downstream from the heatsink (114). Specifically, embodiments of the invention may provide a downstream heatsink, i.e., the airflow directing heatsink (112) that can redirect portions of the first increased flow (216) using the second directed flow (212). In this manner, embodiments of the invention may utilize portions of airflows within a chassis for thermal exchange that would otherwise being unusable to traditional downstream heatsinks.

While the topologies illustrated in FIGS. 2.1-2.3 show an airflow directing heatsink (114) that is downstream from other components, embodiments of the invention include scenarios in which an airflow directing heatsink (112) is upstream of another heatsink. FIG. 2.4 shows a top-view diagram of a chassis in accordance with embodiments of the invention that includes an airflow directing heatsink (112) is upstream of the heatsink (114). Similar to that of the topology of FIG. 2.2, the airflow directing heatsink (112) may generated directed flow (203) that causes an increased flow (206) proximate to the heatsink (114) and reduced flow (204) away from the heatsink (114). In this topology, the impedance of the airflow directing heatsink (112) may be reduced due to the increased heat exchange provided by the auxiliary bodies. In this manner, the total fluid impedance of the chassis may be decreased while still providing the same thermal dissipation capabilities and, consequently, reduce the quantity of power utilized for generating the airflow, e.g., power utilized by fans or other active airflow generation components.

Accordingly, utilizing the degrees of freedom for managing thermal loads provided by an information handling system in accordance with embodiments of the invention, the location of different types of thermal loads within a chassis may be selected to provide thermal management services to the thermal loads and reduce the quantity of power utilized for thermal management or provide increased thermal management capacity so that larger thermal loads may be included in the chassis without reaching temperature limits. In this manner, embodiments of the invention may provide an improved information handling system when compared to contemporary devices.

FIG. 2.5 shows a top-view diagram of an information handling system in accordance with embodiments of the invention. In FIG. 2.5, the locations of high thermal loads (232) and low thermal loads (230) are illustrated. As seen in FIG. 2.5, the low thermal loads (230) are disposed downstream from each other and the high thermal loads (232) are disposed downstream from each other. The auxiliary bodies (125) of the airflow directing heatsink (112) are disposed between the low thermal loads (e.g., 230). In this manner, separate lanes for high thermal load and low thermal load components are generated that enable airflow to be preferentially directed toward the heatsinks that provide thermal management services to the high thermal load (232) components. For additional details regarding lanes, refer to FIG. 2.6.

FIG. 2.6 is a top-view diagram of an information handling system in accordance with embodiments of the invention. In FIG. 2.6, lanes are demarcated using dashed lines. In FIG. 2.6, it is assumed that airflow traverses along the length (top to bottom or the reverse) of the information handling system. As seen in FIG. 2.6, an airflow directing heatsink (250) and a heatsink (252) are disposed in the information handling system proximate to two high thermal load components (not shown). Placement of these heatsinks (250, 252) as illustrated in FIG. 2.6 generates three separate lanes. The first lane is a low temperature lane (240) because no high thermal load components are disposed downstream from each other. In contrast, the second lane is a high temperature lane (242) because the heatsink (252), and high temperature load disposed under the heatsink (252), are downstream of the main body of the airflow directing heatsink (250) which is disposed on a second high thermal load component (not shown). Like the first lane, the third lane is a second low temperature lane (244) because no high thermal load components are disposed downstream from each other in the second low temperature lane (244).

By generating the lanes as shown in FIG. 2.6, embodiments of the invention may provide an improved information handling system that is better able to manage the thermal load of components when compared to contemporary computing devices. Specifically, embodiments of the invention provide for improved thermal management by preferentially directing airflow within the chassis that (i) improves the thermal exchange of the heat exchangers of the heatsinks (250, 252) and (ii) improves the utilization rate of the airflow within the chassis by exchanging heat from the high thermal load components with portions of the airflow disposed in the low temperature lanes (e.g., 240, 244) in addition to the portion of the airflow disposed in the high temperature lane (242).

Thus, embodiments of the invention may provide an information handling system that includes a heatsink that exchanges heat from a first component with a first portion of an airflow; an airflow directing heatsink that (i) simultaneously divides a second portion of the airflow into a first sub-portion and a second sub-portion, (ii) exchanges second heat from a second component with the first sub-portion of the second portion of the airflow, and (iii) exchanges third heat from the second component with both of the first portion of the airflow and the first sub-portion of the second portion of the airflow. The exchange of the third heat may be performed after the exchange of the second heat. The information handling system may further exchange fourth heat from a third component with the first sub-portion of the second portion of the airflow after exchanging the second heat. The third component may be a low thermal load component such as a memory module. The first and second components may be high thermal load components such as processors. The first portion of the airflow may be in a high temperature lane. The second portion of the airflow may be the portion disposed in a low temperature lane. The first sub-portion may be a directed flow. The second sub-portion may be a portion that traverses through an auxiliary body of an airflow directing heatsink.

While the information handling system in accordance with embodiments of the invention has been described by way of specific examples in FIGS. 1.1-2.6, numerous variations are possible that one of ordinary skill in the art would recognize. FIGS. 3.1-3.5 show a limited number of variations but should not be construed as an exhaustive list of variations on embodiments of the invention. In the following diagrams, only a limited number of components are shown to clarify aspects of embodiments of the invention. However, one of ordinary skill in the art will appreciate that additional components may be included without departing from the invention.

For example, in some of the following diagrams, the figures may include illustrations of different memory configures including sockets and memory modules disposed in those sockets. While different grouping of such sockets and memory modules may appear to be of different numbers of sockets and memory modules, the different groupings may actually be of similar number of sockets but some of the sockets may not be populated with memory module. For clarity, unpopulated sockets may not be illustrated because such sockets are not likely to contribute to thermal generation.

FIG. 3.1 shows a top-view diagram of an information handling system in accordance with one or more embodiments of the invention. The information handling system includes an airflow directing heatsink (310) and a heatsink (320). The airflow directing heatsink (310) includes a single auxiliary body (310.2). By including the single auxiliary body (310.2), a low temperature lane (300) and a high temp lane (302) are formed. While not illustrated in FIG. 3.1, any number of components may be disposed in the low temperature lane (300). In this example, the information handling system may preferentially direct airflow within the chassis towards the heatsinks (310, 320) using the fluid impedance of the single auxiliary body (310.2).

FIG. 3.2 shows a top-view diagram of an information handling system in accordance with one or more embodiments of the invention. The information handling system includes a first airflow directing heatsink (330.2), a second airflow directing heatsink (330.4), and a heatsink (320). By placing these heatsinks as illustrated in FIG. 3.2, three lanes are formed. Specifically, a first low temperature lane (350), a high temperature lane (352), and a second low temperature lane (354) are formed. By forming these three lanes, the information handling system may provide improved thermal management services to high thermal loads (not shown) disposed beneath the heatsinks. While illustrated as including two airflow directing heatsinks (330.2, 330.4), an information handling system in accordance with embodiments of the invention may include any number of airflow directing heatsinks (e.g., 330.4, 330.2).

For example, in FIG. 3.2, the system may support three central processing units disposed below the heatsinks. However, a system in accordance with embodiments of the invention may include four central processing units (or other high thermal load generation component) and including a corresponding number of heatsinks and airflow directing heatsinks, five central processing units (or other high thermal load generation component) and including a corresponding number of heatsinks and airflow directing heatsinks, six central processing units (or other high thermal load generation component) and including a corresponding number of heatsinks and airflow directing heatsinks, etc. without departing from the invention.

FIG. 3.3 shows a top-view diagram of an information handling system in accordance with one or more embodiments of the invention. The information handling system may include an airflow directing heatsink (360) and a heatsink (320). By placing the heatsinks as illustrated in FIG. 3.3, three lanes are formed. Specifically, a low temperature lane (390), a high temperature lane (392), and a variable temperature lane (394) are formed. A variable temperature lane (394) may be a lane in which different thermal loads (low, medium, high, etc.) are disposed downstream from each other in the lane. In this example, a low density memory (372), which is a low thermal load, is downstream from a high density memory (370), which is a medium thermal load, in the variable temperature lane (394).

In contrast to the information handling system of FIG. 3.2, airflow directing heatsink (360) includes low thermal exchange heat dissipaters (362) and high thermal exchange heat dissipaters (364). In other words, the heat dissipaters of the exhilarated bodies have different characteristics. For example, the high thermal exchange heat dissipaters (364) may have a higher thermal exchange than the low thermal heat exchange dissipaters (362). Such differing dissipaters may be used in a scenario where different thermal loads downstream of the respective dissipaters are present. For example, in FIG. 3.3, low density memory (372) that generates very little heat and consequently requires very little airflow for cooling purposes to be downstream of the high thermal exchange heat dissipaters (364) enabling more heat from a high thermal load component disposed under the airflow directing heatsink (360) to be dissipated without deleteriously impacting the operation of the low density memory (372) due to the lower cooling requirements of the low density memory (372). In contrast, high density memory (370) may require higher airflow and/or lower temperature of the airflow to dissipate sufficient heat to operate properly.

FIG. 3.4 shows a top-view diagram of an information handling system in accordance with one or more embodiments of the invention. The information handling system may include an airflow directing heatsink (380) and a heatsink (320). By placing the heatsinks as illustrated in FIG. 3.5, three lanes are formed. Specifically, a low temperature lane (390), a high temperature lane (392), and a variable temperature lane (394) are formed. A variable temperature lane (394) may be a lane in which different thermal loads (low, medium, high, etc.) are disposed downstream from each other in the lane. In this example, a high density memory (370), which is a medium thermal load, is downstream from a low density memory (372), which is a medium thermal load, in the variable temperature lane (394).

In contrast to the information handling systems illustrated in FIGS. 3.2-3.3, the airflow directing heatsink (380) includes auxiliary bodies that have dissipaters (380.2, 380.4) with different properties. For example, one of the heat dissipaters may be medium thermal exchange, medium fluid resistant heat dissipaters (380.2) while the other heat dissipaters may be low thermal exchange, low fluid resistance heat dissipaters (380.4). The low thermal exchange, low fluid resistance heat dissipaters (380.4) may be disposed in the variable temperature lane (394) to ensure that the thermal loads in this lane are provided with appropriate airflow for thermal dissipation purposes. For example, because high density memory (370) is disposed downstream of the airflow directing heatsink (380), more airflow or cooler airflow needs to be directed towards the high density memory (370) when compared with the airflow necessary to meet the thermal dissipation needs of the low density memory (372). By disposing the low thermal exchange, low fluid resistance heat dissipaters (380.4) as illustrated in FIG. 3.4, more airflow at a lower temperature is directed toward the high density memory (370) when compared with the airflow directed toward the downstream, low density memory (372) in the low temperature lane (390). By doing so, the information handling system may be able to provide appropriate airflow to thermally manage all of the components disposed within the chassis.

FIG. 3.5 shows a top-view diagram of an information handling system in accordance with one or more embodiments of the invention. The information handling system may include an airflow directing heatsink (400) and a heatsink (320). By placing the heatsinks as illustrated in FIG. 3.4, three lanes are formed. Specifically, a first low temperature lane (350), a high temperature lane (352), and a second low temperature lane (354) are formed. By forming these lanes, the information handling system may provide improved thermal management services to high thermal loads (not shown) disposed beneath the heatsinks.

In contrast to the information handling systems illustrated in FIGS. 3.1-3.4, the airflow directing heatsink (400) includes auxiliary bodies that have airflow directing dissipaters (400.2, 400.4) that direct airflow due to their fluid impedance but also because of angled fins or other elements. For example, both airflow directing heat dissipaters (400.2, 400.4) may include fins that tend to direct air that flows through the dissipaters towards the heatsink (320). Thus, the airflow directing heatsink (400) may further direct the airflow within the chassis by (i) directing a portion of the airflow towards the gap between the airflow directing heat dissipaters (400.2, 400.4) and (ii) directing a second portion of the airflow that flows through the airflow directing heat dissipaters (400.2, 400.4) towards the heatsink (320) after the second portion exits the airflow directing heat dissipaters (400.2, 400.4).

While an information handling system in accordance with embodiments of the invention has been illustrated in FIGS. 1.1-3.5 by way of example, one of ordinary skill in the art that embodiments of the invention are not limited to these specific examples. One of ordinary skill in the art will appreciate that an information handling system that selectively incorporates some or all of the features of the examples shown in FIGS. 1.1-3.5 are contemplated by this disclosure. Additionally, while the examples in FIGS. 1.1-3.5 have been illustrated as including a limited number of components, information handling system in accordance with embodiments of the invention may include additional, fewer, and/or different components without departing from the invention.

Figure 4:
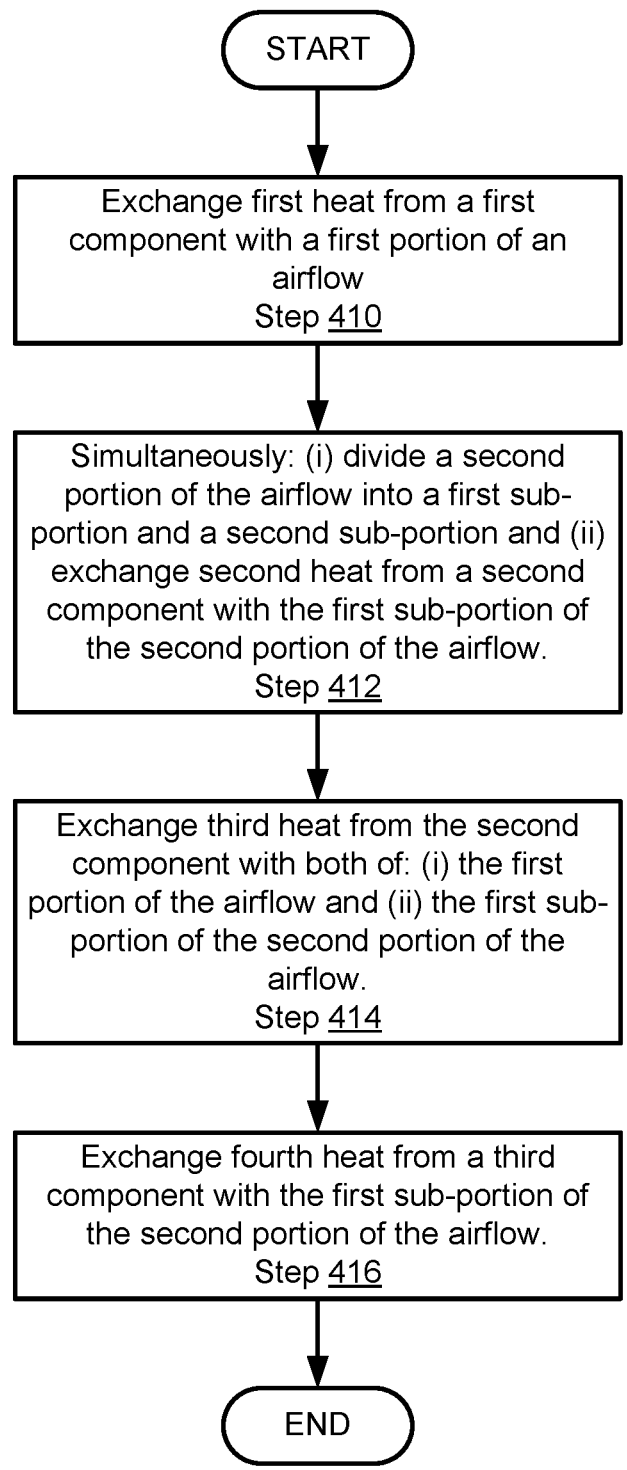
FIG. 4 shows a flowchart of a method of providing thermal management for an information handling system in accordance with one or more embodiments of the invention.

Returning to FIG. 1.1, an information handling system in accordance with embodiments of the invention may provide thermal management services to thermal loads generated by a payload disposed within the information handling system. FIG. 4 illustrates a method that may be performed by components of the system of FIG. 1.1 when providing thermal management services. While the steps in FIG. 4 are illustrated as being in an order, the steps may be performed in a different order, may be performed in parallel, and/or a partially overlapping manner. Further, any of the steps shown in FIG. 4 may be omitted without departing from the invention.

FIG. 4 shows a flowchart of a method in accordance with one or more embodiments of the invention. The method depicted in FIG. 4 may be used to thermally manage an information handling system in accordance with one or more embodiments of the invention. The method shown in FIG. 4 may be performed by, for example, an information handling system (e.g., 100, FIG. 1.1).

In step 410, first heat from a first component is exchanged with a first portion of an airflow.

The first component may be a high thermal load component such as, for example, a processor. The first portion of the airflow may be proximate to the heatsink disposed on the processor.

In step 412, simultaneously: (i) a second portion of the airflow is divided into a first sub-portion and a second sub-portion and (ii) second heat from a second component is exchanged with the first sub-portion of the second portion of the airflow.

The second portion of the airflow may not be proximate to the heatsink. In other words, the second portion of the airflow may be in the lane that is different from the lane in which the second portion of the airflow traverses through the heatsink.

Once divided, the first sub-portion of the second portion of the airflow may be directed towards the second component that may be a second high thermal load component such as, for example, a second processor. The second sub-portion of the second portion of the airflow traverse an auxiliary body of an airflow directing heatsink.

The second heat may be exchanged via heat exchangers disposed on the exhilarate body.

In step 414, third heat from the second component is exchanged with both of: (i) the first portion of the airflow and (ii) the first sub-portion of the second portion of the airflow. For example, the first portion of the airflow in the first sub-portion of the second portion of the airflow may be combined and directed through a main body of an airflow directing heatsink disposed on the second component.

In step 416, fourth heat from the third component is exchanged with the first sub-portion of the second portion of the airflow.

The third component may be a low thermal load component such as, for example, memory or storage modules. The fourth heat may be exchanged after the second heat is exchanged. For example, the first sub-portion of the second portion of the airflow may exchange heat with an auxiliary body before exchanging heat with the third component.

The method may end following step 416.

Figure 5:
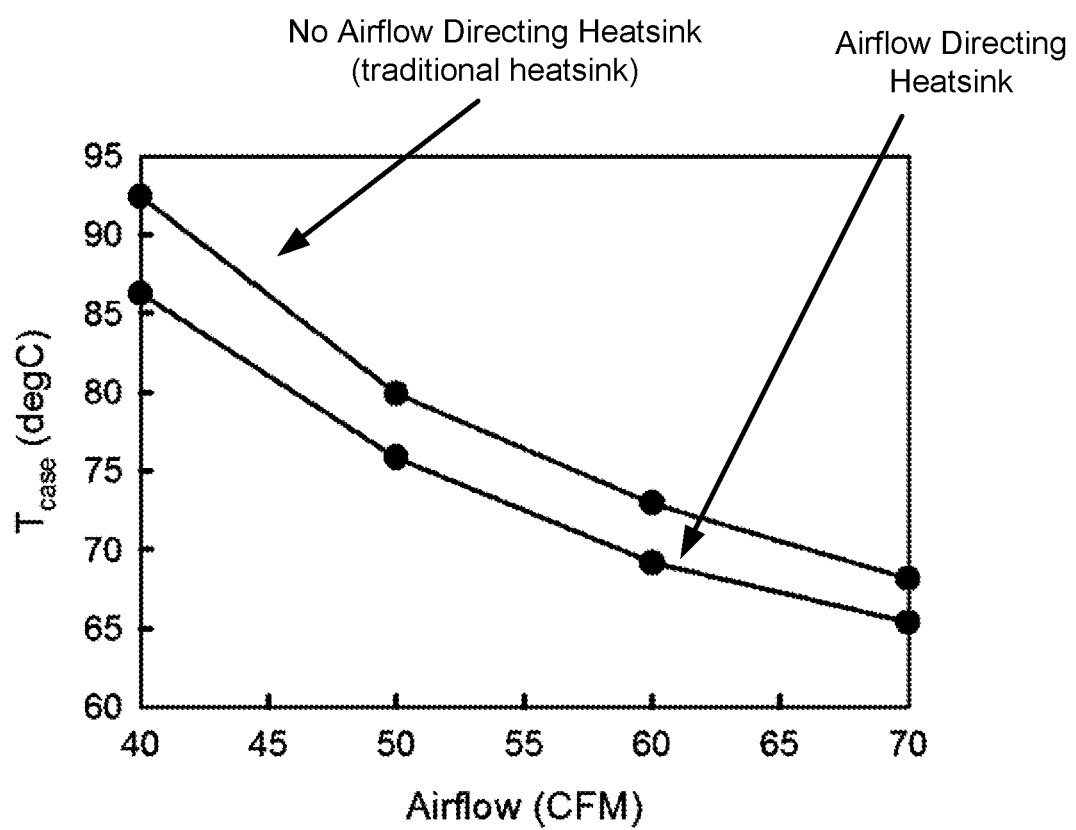
FIG. 5 shows a diagram of ambient temperatures within an information handling system that includes an airflow directing heatsink in accordance with embodiments of the invention.

As noted above, an information handling system in accordance with embodiments of the invention may provide reduced operating temperatures of components disposed within information handling system compared with contemporary systems. FIG. 5 shows a diagram of experimental results comparing the operating temperature within an information handling system that includes an airflow directing sink to an information handling system that does not include an airflow directing heatsink, e.g., a traditional heatsink replaces the airflow directing heatsink for comparison purposes.

In FIG. 5, a plot of the temperature of the component for which the airflow directing heatsink is providing thermal dissipation services and a traditional heatsink is providing thermal dissipation services in each respective information handling systems vs. the rate of airflow within the information handling systems is shown. The interior configuration of the information handling system including the airflow directing heatsink is similar to that shown in FIG. 2.3. In contrast, the internal configuration of the information handling system that does not include the airflow directing heatsink includes two heatsinks that are not airflow directing. In other words, the airflow directing heatsink was replaced with a traditional heatsink for comparison purposes.

As seen from the plot in FIG. 5, the component temperature within the information handling system that includes the airflow directing heatsink is substantially lower across all airflow rates. For example, at 40 cubic feet per minute, the ambient temperature in the chassis of the information handling system including the airflow directing heatsink was 86 degrees Centigrade while the ambient temperature in the chassis of the information handling system that did not include the airflow directing heatsink was 92.5 degrees Centigrade.

By virtue of this difference in temperature, the information handling system that includes the airflow directing heatsink may operate its active airflow devices at a lower airflow rate while maintaining the same temperature within the chassis. For example, if a desired interior temperature of 75 degrees Centigrade is desired, only a flow rate of 50 cubic feet per minute is required (in contrast, an information handling system that does not include an airflow directing heatsink requires an airflow rate of near 50 cubic feet per minute which results in the consumption of far larger amounts of power to generate the prescribed flow rate). Alternatively, the information handling system that includes the airflow directing heatsink may include components that generate larger thermal loads (such as higher bin/faster processors) while still maintaining the same ambient temperature as an information handling system that does not include the airflow directing heatsink. Thus, embodiments of the invention may provide an improved information handling system that can process information more quickly or utilize less power to perform the same quantity of computations when compared with contemporary computing devices.

As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), a thermal manager (614) and numerous other elements (not shown) and functionalities. Each of these components is described below.

In one or more embodiments of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one or more embodiments of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

In one or more embodiments of the invention, the thermal manager (614) manages the thermal state of components disposed an information handling system. The thermal manager (614) may be a physical or logical entity. When implemented as a physical entity, the thermal manager (614) may be a hardware device for managing operation of active components for thermal management within information handling system. When implemented as a logical entity, the thermal manager (614) may be instructions stored on a persistent storage of information handling device when executed by a processor of the information handling system causes the information handling device to perform the functionality of the thermal manager (614).

The thermal manager (614) may manage the operation of any number of active devices included in the information handling system. The devices may include air moving units such as fans. Thermal manager (614) may manage operation of the active devices by controlling the rate of airflow disposed within the information handling system using the active devices. For example, the thermal manager (614) may control the flow of electric current to fans or other airflow control devices that causes the airflow control devices to modify the airflow disposed within the information handling system.

As discussed above, an information handling system may provide thermal dissipation services for high thermal load and/or low thermal load generating components. A high thermal load generating component may be, for example, a processor, a graphics processing unit, or other type of processing device. A low thermal load generating component may be a memory module such as a dual inline memory module, a flash memory module, or other type of memory, storage, or communication component. A high thermal load generating component may generate more than 10 times the thermal load generated by a low thermal load generating component. A high thermal load generating component may generate more than 20 times the thermal load generated by a low thermal load generating component. A high thermal load generating component may generate more than 30 times the thermal load generated by a low thermal load generating component.

In one or more embodiments of the invention, an information handling system provides thermal dissipation services using airflow. Airflow that is proximate to a component may exchange heat with the component. Airflow that is not proximate to a component may not exchange heat with the component. The information handling system may direct different portions of airflow to be proximate or not proximate to different components to control the rate of thermal exchange of heat between the components and airflow with the information handling system.

Embodiments of the invention may provide an improved method of managing thermal loads within an information handling system. For example, an information handling system in accordance with embodiments of the invention includes an airflow directed heatsink that both exchanges heat and directs the flow of air within the chassis of the information handling system. By doing so, an information handling system in accordance with embodiments of the invention may provide components within the chassis with a lower operating temperature when compared with contemporary approaches for similar components with a similar thermal load.

Thus, one or more embodiments of the invention may be directed toward the problem of thermal generation in information handling systems. Accordingly, embodiments of the invention may address a technical problem due to the nature of the environment in which information handling systems reside. For example, failure to manager thermal generation may cause components of an information handling system to not be able to perform their respective functions due to operating temperature limitations of the components.

The problems discussed and throughout this disclosure above should be understood as being examples of problems solved by embodiments of the invention disclosed in this application and the invention should not be limited to solving the same/similar problems. The disclosed invention is broadly applicable to address a range of problems beyond those discussed in this application.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. An information handling system, comprising
a chassis adapted to direct an airflow along a payload; and
the payload, disposed in an internal space of the chassis, comprising:
    a heatsink for cooling a first component using a first portion of the airflow; and
    an airflow directing heatsink for cooling a second component, wherein the airflow directing heatsink is adapted to:
        use both of the first portion of the airflow and a second portion of the airflow for cooling the second component, and
        physically divide an entirety of the internal space of the chassis into:
            a first area where only the first portion of the airflow flows;
            a second area where both the first portion of the airflow and the second portion of the airflow flows; and
            an intermediate area between the first area and the second area where a first sub-portion of the first portion of the airflow becomes the second portion of the airflow.

2. The information handling system of claim 1, wherein the second portion of the airflow is offset from the first portion of the airflow.

3. The information handling system of claim 1, wherein the airflow directing heatsink comprises:

a first set of heat exchangers disposed proximate to the second component; and
a second set of heat exchangers not disposed proximate to the second component.

4. The information handling system of claim 3, wherein the second set of heat exchangers are adapted to:
direct a first sub-portion of the second portion of the airflow towards the first set of heat exchangers; and
direct a second sub-portion of the second portion of the airflow away from the first set of heat exchangers.

5. The information handling system of claim 3, wherein both the first set of heat exchangers and the second set of heat exchangers are thermally connected to the second component via a thermal conduction path.

6. The information handling system of claim 3, wherein the second set of heat exchangers is disposed downstream from the heatsink.

7. The information handling system of claim 3, wherein the first set of heat exchangers is disposed downstream from the second set of heat exchangers.

8. The information handling system of claim 1, wherein the payload further comprises a third component disposed downstream from the airflow directing heatsink.

9. The information handling system of claim 8, wherein the airflow directing heatsink is adapted to direct a sub-portion of the second portion of the airflow away from the third component.

10. The information handling system of claim 9, wherein the airflow directing heatsink is adapted to direct the sub-portion of the second portion of the airflow toward the second component.

11. The information handling system of claim 10, wherein the second component is a high thermal load component and the third component is a low thermal load component.

12. The information handling system of claim 10, wherein the second component is a processor and the third component is a memory.

13. A method for thermally managing an information handling system, comprising:
exchanging, using a heatsink, first heat from a first component with a first portion of an airflow;
simultaneously, using an airflow directing heatsink:
dividing a second portion of the airflow into a first sub-portion and a second sub-portion, and
exchanging second heat from a second component with the first sub-portion of the second portion of the airflow; and
exchanging, using the airflow directing heatsink, third heat from the second component with both of:
the first portion of the airflow, and
the first sub-portion of the second portion of the airflow,
wherein the exchange of the third heat is performed after the exchange of the second heat.

14. The method of claim 13, further comprising:
exchanging fourth heat from a third component with the first sub-portion of the second portion of the airflow after exchanging the second heat.

15. An information handling system, comprising:
a chassis adapted to direct an airflow along a payload; and
the payload, disposed in an internal space of the chassis, comprising:
a heatsink for cooling a first component using a first portion of the airflow; and
an airflow directing heatsink adapted to:
cool a second component,
direct the airflow to enhance a downstream flowrate of a second portion of the airflow proximate to a high thermal load component, and
physically divide an entirety of the internal space of the chassis into:
a first area where only the first portion of the airflow flows,
a second area where both the first portion of the airflow and the second portion of the airflow flows, and
an intermediate area between the first area and the second area where a first sub-portion of the first portion of the airflow becomes the second portion of the airflow.

16. The information handling system of claim 15, wherein the heatsink comprises a first heat exchanger, wherein the airflow directing heatsink comprises a second heat exchanger and a third heat exchanger.

17. The information handling system of claim 16, wherein the first heat exchanger has a higher fluid flow impedance than a fluid flow impedance of the second heat exchanger.

18. The information handling system of claim 16, wherein the first heat exchanger exchanges a larger quantity of heat than a quantity of heat exchanged by the second heat exchanger.

19. The information handling system of claim 16, wherein the first component and the second component generate a same thermal dissipation requirement, wherein the first component and the second component are a same type of component, wherein the second component is a high thermal load component.

* * * * *